United States Patent [19]
Oyama et al.

[11] Patent Number: 5,870,750
[45] Date of Patent: Feb. 9, 1999

[54] INFORMATION RETRIEVAL SYSTEM FOR RETRIEVING A RECORD OF DATA INCLUDING A KEYWORD

[75] Inventors: Takamasa Oyama, Kamakura; Tomoko Fujita; Tetsuya Kinoshita, both of Kawasaki; Chuichi Kikuchi, Ichikawa; Hirobumi Shinoki, Yokohama, all of Japan

[73] Assignee: Matsushita Electric Industrial Co., Ltd., Osaka, Japan

[21] Appl. No.: 865,309

[22] Filed: May 29, 1997

[51] Int. Cl.[6] ................................................ G06F 17/30
[52] U.S. Cl. .................... 707/101; 707/100; 707/102; 707/1; 707/6; 707/7
[58] Field of Search ................................ 707/100, 101, 707/102, 1, 6, 7, 5, 10; 395/34, 200

[56] References Cited

U.S. PATENT DOCUMENTS 5,465,370  1/1995  Ito ........................................ 395/200.34
5,715,446  2/1998  Kinoshita .................................. 707/5

*Primary Examiner*—Thomas G. Black
*Assistant Examiner*—Diane D. Mizrahi
*Attorney, Agent, or Firm*—Lowe Hauptman Gopstein Gilman & Berner

[57] ABSTRACT

A division code is added to both ends of a group of pieces of data registered in an item of a data record L and between each pair of adjacent data, so that a piece of code-added data is produced. Thereafter, a character chain pattern (C1,C2) of each pair of adjacent characters C1 and C2 in the code-added data is prepared, an occurrence frequency Fi of each character Ci in each piece of data H is calculated, and character chain information (F1,F2,H,L) corresponding to each character chain pattern (C1,C2) is prepared. Therefore, a index file in which pieces of character chain information prepared for the same item of a plurality of data records are listed is prepared. When a keyword is input by a user, the division code is added to both ends of the keyword to produce a code-added keyword, and a series of keyword character chain patterns is prepared from the code-added keyword in the same manner. Thereafter, a series of particular character chain information (F1,F2,H,L) corresponding to the series of keyword character chain patterns on condition that F2 of first information equals to F1 of second information following the first information and data numbers H and record numbers L are respectively the same value. Therefore, a particular data record L in which a piece of particular data H including the keyword is registered can be quickly retrieved.

12 Claims, 26 Drawing Sheets

| RECORD NUMBER | ITEM 1 (PREFECTURE NAME) | ITEM 2 (CITY NAME) | ITEM 3 | ... |
|---|---|---|---|---|
| 1 | KANAGAWA | YOKOHAMA | ... | ... |
| 2 | KANAGAWA | KAMAKURA | ... | ... |
| ⋮ | ⋮ | ⋮ | | |

FIG. 3A

DATA OF ITEM 2

"abcad, abad, afae"

FIG. 3B

CODE-ADDED DATA

"^wabcad^wabad^wafae^w"

FIG. 3C

LIST OF CHARACTER OCCURRENCE FREQUENCIES

| CODE-ADD DATA ; ^wabcad ^wabad ^wafae^w | | | |
|---|---|---|---|
| CHARACTER TYPE | OCCURRENCE FREQUENCIES IN DATA 1 | OCCURRENCE FREQUENCIES IN DATA 2 | OCCURRENCE FREQUENCIES IN DATA 3 |
| a | 1    2 | 1    2 | 1    2 |
| b | 1 | 1 | |
| c | 1 | | |
| d | | 1 | 1 |
| e | | | 1 |
| f | | | 1 |
| ^w | ○    ○ | ○ | ○ |

FIG. 3D

INDEX FILE

| TYPE OF CHARACTER CHAIN INFORMATION | CHARACTER CHAIN PATTERN | LIST OF CHARACTER CHAIN INFORMATION FOR ITEM 2 |
|---|---|---|
| FRONT CODE-ADDED INFORMATION | (^w, a) | (m, 1, 1, 1), (m, 1, 2, 1), (m, 1, 3, 1) |
| REAR CODE-ADDED INFORMATION | (d, ^w) | (1, m, 1, 1), (1, m, 2, 1), |
| | (e, ^w) | (1, m, 3, 1) |
| NO-CODE INFORMATION | (a, b) | (1, 1, 1, 1), (1, 1, 2, 1) |
| | (a, d) | (2, 1, 1, 1), (2, 1, 2, 1) |
| | (a, e) | (2, 1, 3, 1) |
| | (a, f) | (1, 1, 3, 1) |
| | (b, a) | (1, 2, 2, 1) |
| | (b, c) | (1, 1, 1, 1) |
| | (c, a) | (1, 2, 1, 1) |
| | (e, a) | (1, 2, 3, 1) |
| | (f, a) | (1, 2, 3, 1) |

FIG. 4A

KEYWORD
"afae"  (PERFECT CHARACTER AGREEMENT RETRIEVAL)

FIG. 4B

CODE-ADDED KEYWORD
"^wafae^w"

FIG. 4C

A SERIES OF KEYWORD CHARACTER CHAIN PATTERNS
(^w,a), (a,f), (f,a), (a,e), (e,^w)

FIG. 6

| RECORD NUMBER | ITEM 1 | ITEM 2 | ... | ITEM N |
|---|---|---|---|---|
| 1 | DATA, DATA, ... | DATA 1, DATA 2, ... | ... | DATA, DARA |
| 2 | DATA, DATA, ... | DATA, DATA, ... | ... | DATA, DARA |
| ⋮ | ⋮ | ⋮ | ⋮ | ⋮ |

FIG. 8

| TYPE | CHARACTER CHAIN PATTERN | CHARACTER CHAIN INFORMATION (ITEM 1) | ... | CHARACTER CHAIN INFORMATION (ITEM N) |
|---|---|---|---|---|
| FIRST TYPE OF CHARACTER CHAIN INFORMATION | $(\hat{w}, c(2))$ | $(m, F2, K, L)$ | ... | ... |
| SECOND TYPE OF CHARACTER CHAIN INFORMATION | $(c(1), \hat{w})$ | $(F1, m, K, L)$ | ... | ... |
| THIRD TYPE OF CHARACTER CHAIN INFORMATION | $(c(1), c(2))$ | $(F1, F2, K, L)$ | ... | ... |

FIG. 9A

⟨PATTERN 1⟩ "af ?"

⟨PATTERN 2⟩ "abad"

FIG. 9B

⟨PATTERN 1⟩ "$\hat{}$waf" (FRONT CHARACTER AGREEMENT RETRIEVAL)

⟨PATTERN 2⟩ "$\hat{}$wabad$\hat{}$w" (PERFECT CHARACTER AGREEMENT RETRIEVAL)

FIG. 9C

⟨PATTERN 1⟩ $(\hat{w}, a), (a, f)$

⟨PATTERN 2⟩ $(\hat{w}, a), (a, b), (b, a), (a, d), (d, \hat{w})$

FIG. 9D

⟨PATTERN 1⟩

|  | FIRST COLLATION | SECOND COLLATION | THIRD COLLATION |
|---|---|---|---|
| FIRST CHARACTER CHAIN PATTERN (^w, a) | (m, 1, 1, 1) ↕ NOT MATCHED | (m, 1, 2, 1) ↕ NOT MATCHED | (m, 1, 3, 1) ↕ MATCHED |
| SECOND CHARACTER CHAIN INFORMATION (a, f) | (1, 1, 3, 1) →  | → |  |

FIG. 9E

⟨PATTERN 2⟩

| CHARACTER CHAIN PATTERN | CHARACTER CHAIN INFORMATION |
|---|---|
| (^w, a) | (m, 1, 1, 1)   (m, 1, 2, 1)   (m, 1, 3, 1) |
|  | NOT MATCHED ↖   ↑ MATCHED   ↗ NOT MATCHED |
| (a, b) | (1, 1, 1, 1)   (1, 1, 2, 1) |
|  | NOT MATCHED ↖   ↑ MATCHED |
| (b, a) | (1, 2, 2, 1) |
|  | NOT MATCHED ↗   ↑ MATCHED |
| (a, d) | (2, 1, 1, 1)   (2, 1, 2, 1) |
|  | ↑ MATCHED   ↑ MATCHED |
| (d, ^w) | (1, m, 1, 1)   (1, m, 2, 1) |

FIG. 9F

⟨PATTERN 1⟩ ITEM 2, RECORD NUMBER L=1, DATA 3
           CONTENTS OF DATA RECORD 1

⟨PATTERN 2⟩ ITEM 2, RECORD NUMBER L=1, DATA 2
           CONTENTS OF DATA RECORD 1

FIG. 12

| RECORD NUMBER | ITEM 1 | ITEM 2 | ... | ITEM N |
|---|---|---|---|---|
| 1 | | Abe Lincoln, Bill Clinton | | |
| 2 | | | | |
| | | | | |

CODE-ADDED DATA

"^w⌴Abe⌴Lincoln^w⌴⌴Bill⌴Clinton^w"

LETTER SETS (^w,⌴), (⌴,A), (b,e), (⌴,L), (i,n), (c,o), (l,n), (^w,⌴), (⌴,B), (i,l), (l,⌴), (⌴,c), (l,i), (n,t)

(o,n), (^w^w)

LETTER SET CHAIN PATTERNS

| CHARACTER CHAIN PATTERN | CHARACTER CHAIN INFORMATION |
|---|---|
| (^w, a) | (m, 1, 1, 1)  (m, 1, 2, 1)  (m, 1, 3, 1) |
| (a, f) | (1, 1, 3, 1) |
| (f, a) | (1, 2, 3, 1) |
| (a, e) | (1, 2, 3, 1) |
| (e, ^w) | (1, m, 3, 1) |

FIG. 18A

LIST OF CHARACTER OCCURRENCE FREQUENCIES

| CODE-ADDED DATA ; ˆwabcad ˆwabad ˆwafaeˆw | | | |
|---|---|---|---|
| CHARACTER TYPE | OCCURRENCE FREQUENCY IN DATA 1 | OCCURRENCE FREQUENCY IN DATA 2 | OCCURRENCE FREQUENCY IN DATA 3 |
| a | 1   2 | 1   2 | 1   2 |
| b | 1 | 1 | |
| c | 1 | | |
| d | 1 | 1 | |
| e | | | 1 |
| f | | | 1 |
| ˆw | ○ | ○ | ○   ○ |
| FRONT CODE-ADDED CHARACTER CHAIN | ˆwab | ˆwab | ˆwaf |
| REAR CODE-ADDED CHARACTER CHAIN | adˆw | adˆw | aeˆw |

FIG. 18B

INDEX FILE

| GROUP | CHARACTER CHAIN PATTERN | CHARACTER CHAIN INFORMATION FOR ITEM 2 |
|---|---|---|
| FRONT CODE-ADDED GROUP | ˆw(a, b) | (1, 1, 1, 1), (1, 1, 2, 1) |
| | ˆw(a, f) | (1, 1, 3, 1) |
| REAR CODE-ADDED GROUP | (a, d)ˆw | (2, 1, 1, 1), (2, 1, 2, 1) |
| | (a, e)ˆw | (2, 1, 3, 1) |
| NO-CODE GROUP | (a, b) (a, d) (a, e) (a, f) (b, a) (b, c) (c, a) (e, a) (f, a) | (1, 2, 2, 1) (1, 1, 1, 1) (1, 2, 1, 1) (1, 2, 3, 1) (1, 2, 3, 1) |

FIG. 20A

KEYWORD ; "afae"

FIG. 20B

CODE-ADDED KEYWORD "^wafae^w"

FIG. 20C

FRONT CODE-ADDED KEYWORD CHARACTER CHAIN PATTERN ; ^w(a, f)

NO-CODE KEYWORD CHARACTER CHAIN PATTERN ; (f, a)

REAR CODE-ADDED KEYWORD CHARACTER CHAIN PATTERN ; (a, e)^w

FIG. 20D

| CHARACTER CHAIN PATTERN | CHARACTER CHAIN INFORMATION |
|---|---|
| ^w(a, f) | (1, 1, 3, 1) |
|  | ↕ MATCHED |
| (f, a) | (1, 2, 3, 1) |
| (f, a) | (1, 2, 3, 1) |
|  | ↕ MATCHED |
| (a, e)^w | (2, 1, 3, 1) |

FIG. 20E

RETRIEVED INFORMATION ; ITEM 2, DATA RECORD 1
DATA 3
CONTENTS OF DATA RECORD 1

FIG. 23A

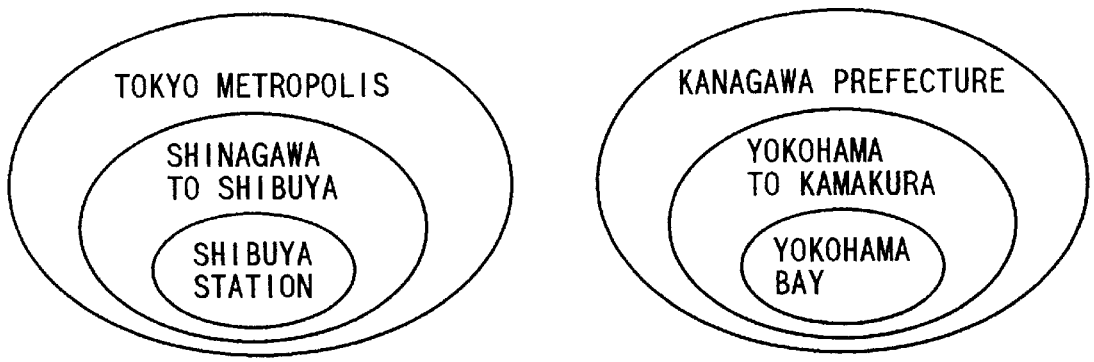

FIG. 23B

CODE-ADDED DATA

"^S TOKYO METROPOLIS^S^T SHINAGAWA TO SHIBUYA^T^U SHIBUYA STATION^U^S KANAGAWA PREFECTURE^S^T YOKOHAMA TO KAMAKURA^T ^U YOKOHAMA BAY^U"

FIG. 23C

INDEX FILE

| TYPE | HIERARCHY LEVEL | CHARACTER CHAIN PATTERN | CHARACTER CHAIN INFORMATION |
|---|---|---|---|
| FIRST TYPE OF CHARACTER CHAIN INFORMATION | LEVEL 1 | (^S, TO)<br>(^S, KA) | (1,1,1,1)<br>(1,1,4,1) |
| | LEVEL 2 | (^T, SHINA)<br>(^T, YOKO) | (2,1,2,1)<br>(2,1,5,1) |
| | LEVEL 3 | (^U, SHIBU)<br>(^U, YO) | (3,1,3,1)<br>(3,1,6,1) |
| SECOND TYPE OF CHARACTER CHAIN INFORMATION | LEVEL 1 | (METROPOLIS, ^S)<br>(PREFECTURE, ^S) | (1,1,1,1)<br>(1,1,4,1) |
| | LEVEL 2 | (YA, ^T)<br>(KURA, ^T) | (1,2,2,1)<br>(1,2,5,1) |
| | LEVEL 3 | (STATION, ^U)<br>(BAY, ^U) | (1,3,3,1)<br>(1,3,6,1) |
| THIRD TYPE OF CHARACTER CHAIN INFORMATION | | (KYO,METOROPOLIS),<br>(SHINA,GAWA), (GAWA,TO)<br>(TO,SHIBU), ···<br>(YOKO,HAMA), (HAMA,BAY) | (1,1,1,1), (1,1,2,1)<br>(1,1,2,1), (1,1,2,1)<br>···<br>(1,1,6,1), (1,1,6,1) |

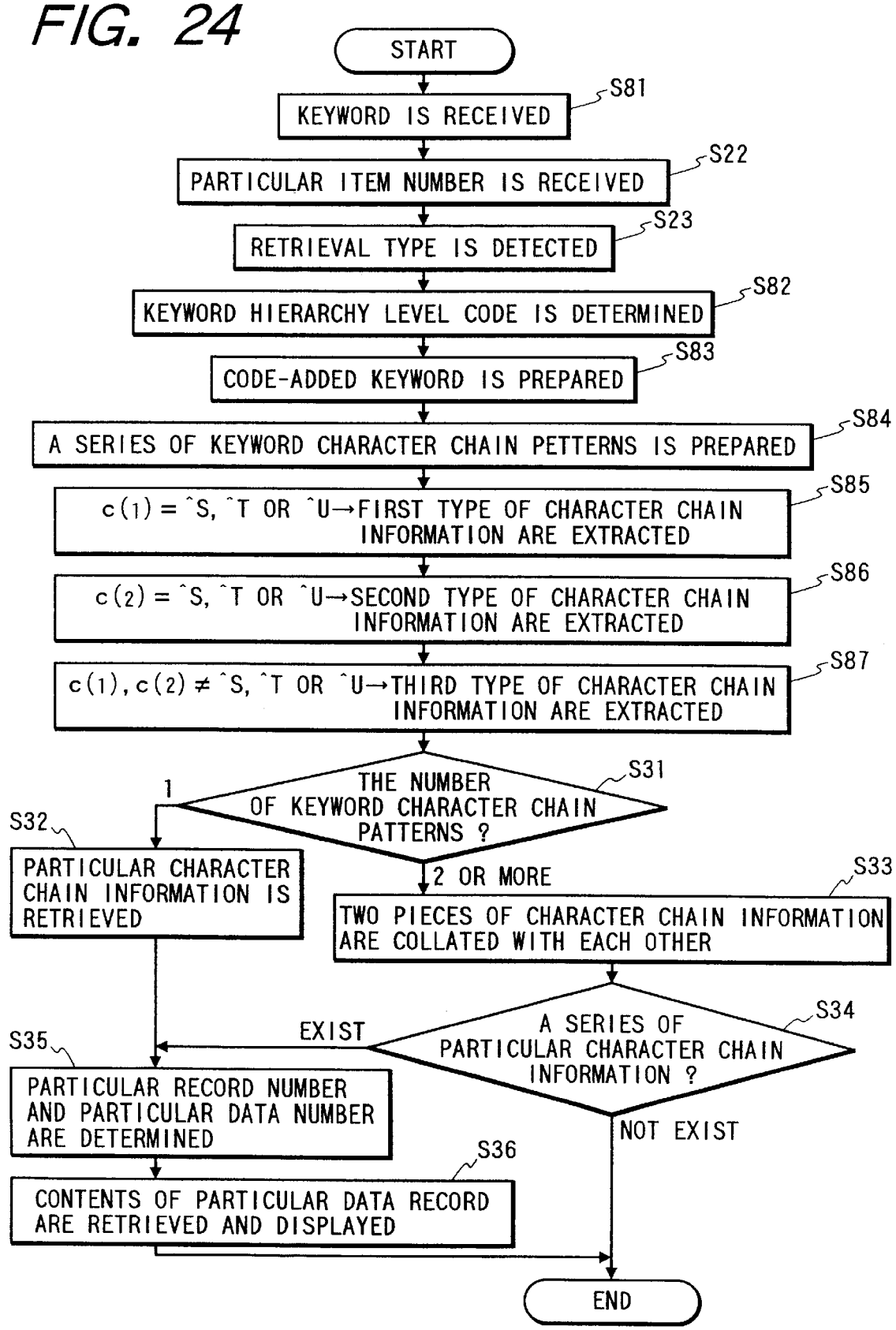

FIG. 25A

KEYWORD "? SHIBUYA"

SECOND HIERARCHY LEVEL

FIG. 25B

CODE-ADDED KEYWORD ; "SHIBUYA^T"

FIG. 25C

KEYWORD CHARACTER CHAIN PATTERNS (SHIBU, YA), (YA, ^T)

FIG. 26

DATA IN ITEM K

ORDINAL NUMBER: TOKYO METROPOLIS, SHINAGAWA TO SHIBUYA, SHIBUYA STATION,
(1)　　　　　　　(2)　　　　　　　　(3)

KANAGAWA PREFECTURE, YOKOHAMA TO KAMAKURA, YOKOHAMA BAY
(1)　　　　　　　(2)　　　　　　　(3)

FIG. 28

INDEX FILE

| TYPE | SEQUENT ORDER | CHARACTER CHAIN PATTERN | CHARACTER CHAIN INFORMATION |
|---|---|---|---|
| FIRST TYPE OF CHARACTER CHAIN INFORMATION | 1 | (^S, TO)<br>(^S, KA) | (1,1,1,1)<br>(1,1,4,1) |
| | 2 | (^T, SHINA)<br>(^T, YOKO) | (2,1,2,1)<br>(2,1,5,1) |
| | 3 | (^U, SHIBU)<br>(^U, YO) | (3,1,3,1)<br>(3,1,6,1) |
| SECOND TYPE OF CHARACTER CHAIN INFORMATION | 1 | (METROPOLIS, ^S)<br>(PREFECTURE, ^S) | (1,1,1,1)<br>(1,1,4,1) |
| | 2 | (YA, ^T)<br>(KURA, ^T) | (1,2,2,1)<br>(1,2,5,1) |
| | 3 | (STATION, ^U)<br>(BAY, ^U) | (1,3,3,1)<br>(1,3,6,1) |
| THIRD TYPE OF CHARACTER CHAIN INFORMATION | (KYO, METOROPOLIS),<br>(SHINA, GAWA), (GAWA, TO)<br>(TO, SHIBU), ···<br>(YOKO, HAMA), (HAMA, BAY) | | (1,1,1,1), (1,1,2,1)<br>(1,1,2,1), (1,1,2,1)<br>···<br>(1,1,6,1), (1,1,6,1) |

INFORMATION RETRIEVAL SYSTEM FOR RETRIEVING A RECORD OF DATA INCLUDING A KEYWORD

BACKGROUND OF THE INVENTION

1. Field of the Invention

The present invention relates generally to an information retrieval system for retrieving a data record of particular data including a keyword input by a user from a data base in which a large amount of data is registered in a plurality of data records, and more particularly to an information retrieval system for correctly retrieving a data record relating to desired data from a data base such as a data table.

2. Description of the Related Art

In the information retrieval, an automatic information retrieval system in which all data registered in a data base is checked and particular data including a keyword is automatically retrieved when a user inputs the keyword composed of a string of characters has been recently paid attention. In particular, the automatic information retrieval system has been manufactured in a relational data base managing system (RDBMS) and has been applied for various technical fields.

2.1. Previously Proposed Art

In a conventional relational data base, as shown in FIG. 1, for example, a record relating to Yokohama city of Kanagawa prefecture is registered in a recording region identified by a record number 1, and a record relating to Kamakura city of Kanagawa prefecture is registered in a recording region identified by a record number 2. In this case, a plurality of items indicating attributes of each record are arranged as a data structure, attribute data indicating one attribute is stored in each item in correspondence to each record number, so that a data base formed in a table is obtained.

When a user desires to retrieve a record relating to "Kamakura city" from the data base, as shown in FIG. 2, the user inputs an item (item 2) of the table and a keyword "Kamakura" to a conventional information retrieval system. Thereafter, a large amount of data registered in the data base is read out to the conventional information retrieval system, the item 2 is set as a retrieved item, and the keyword is collated with data of the item 2 for each record number. When particular data agreeing with the keyword is detected, a record number (the record number 2) corresponding to the particular data is output.

Therefore, a desired record can be retrieved in the conventional information retrieval system by using an item and a keyword input by the user as a key.

2.2. Problems to be Solved by the Invention

However, in the conventional information retrieval system, in cases where a first record relates to "Chinese town" of Yokohama city and a second record relates to "Yamashita park" of Yokohama city, a specific item relating to a famous place is added to the data base, data "Chinese town" is additionally registered in the specific item of the first record, and data "Yamashita park" is additionally registered in the specific item of the second record. Therefore, there is a drawback that the number of items is considerably increased.

Also, in cases where the user desires a record relating to the Chinese town of Yokohama city, the user is required to specify an item relating to a city name and an item relating to a famous place. In this case, the user is required to know in advance that the Chinese town is registered in the item relating to the famous place. Therefore, there is another drawback that it is troublesome to operate the conventional information retrieval system and it takes a long time to retrieve a desired record.

To avoid the above drawbacks, a method in which pieces of data are registered in each item is known. For example, a piece of data "Yokohama" and a piece of data "Chinese town" are registered in one item as combined data "Yokohama Chinese town". Also, a piece of data "Yokohama" and a piece of data "Yamashita park" are registered in one item as combined data "Yokohama Yamashita park". In this case, because a record relating to the data "Chinese town", a record relating to "Yamashita park" or a record relating to the data "Yokohama" is not exist, even though the user intends to retrieve a record relating to only the data "Yokohama", the record cannot be retrieved.

In this case, when the conventional information retrieval system is operated so as to retrieve all records respectively relating to data including a word "Yokohama", the user can obtain a desired record. However, a large number of records not desired by the user are output, so that it is troublesome to select the desired record from a large number of records relating to "Yokohama".

Also, in cases where pieces of data are registered in each item, a character string indicating the combined data is lengthened. In this case, because it is checked character by character whether or not a keyword input by the user agrees with a group of characters in the combined data, it takes a long time to collate the keyword with the combined data.

Also, to retrieve a record relating to long data, a front character agreement retrieval, a rear character agreement retrieval and a perfect agreement retrieval are known. In the front character agreement retrieval, it is checked whether or not a series of characters of a keyword agrees with a series of characters placed in a top region of long data. In the rear character agreement retrieval, it is checked whether or not a series of characters of a keyword agrees with a series of characters placed in a rear region of long data. In the perfect agreement retrieval, it is checked whether or not a series of characters of a keyword agrees with a series of all characters of a piece of data. However, the retrieving time still becomes long.

SUMMARY OF THE INVENTION

An object of the present invention is to provide, with due consideration to the drawbacks of such a conventional information retrieval system, an information retrieval system in which a particular data record relating to a piece of particular data including a keyword is retrieved from a table of data records with a high speed even though a large number of pieces of data are registered in a plurality of items of each data record and pieces of data are registered in each item.

The object is achieved by the provision of an information retrieval system, comprising:

data record storing means for storing a plurality of data records, pieces of data respectively composed of a plurality of characters being registered in a particular item of each data record;

division code adding means for adding a division code to both ends of a group of the pieces of data registered in the particular item and between each pair of data adjacent to each other in the group of the pieces of data for each data record to produce a piece of code-added data for each data record, each piece of data in the code-added data being placed between the division codes;

number allocating means for allocating a record number to each piece of data registered in each data record to identify the data records relating to the pieces of data, and allocating a data number to each piece of data registered in the particular item of each data record to identify the pieces of data;

character occurrence frequency calculating means for calculating an occurrence frequency of each of a plurality of characters for each piece of data registered in the particular item and setting an occurrence frequency of each of the division codes of the code-added data to a particular value, an occurrence frequency of a current character in one piece of data indicating that at what frequency a character belonging to the same character type as that of the current character appears among characters placed between a top position of the piece of data and a current position of the current character;

character chain pattern preparing means for preparing a first character chain pattern of each pair of characters adjacent to each other in the code-added data produced by the division code adding means and preparing a second character chain pattern of each pair of one division code and one character adjacent to the division code in the code-added data;

character chain information preparing means for preparing a piece of character chain information corresponding to each of the first and second character chain patterns prepared by the character chain pattern preparing means according to the occurrence frequencies obtained by the character occurrence frequency calculating means and the data numbers and the record numbers allocated by the number allocating means, each piece of character chain information being composed of two occurrence frequencies of two characters of one piece of data or both one character and one division code of one piece of data corresponding to one first or second character chain pattern, one data number of the piece of data and one record number of the piece of data;

index file preparing means for preparing an index file for the particular item in which the pieces of character chain information prepared by the character chain information preparing means are listed in correspondence to the first and second character chain patterns prepared by the character chain pattern preparing means;

keyword preparing means for preparing a keyword composed of a plurality of characters;

keyword division code adding means for adding the division code to one end or both ends of the keyword prepared by the keyword preparing means to produce a piece of code-added keyword;

keyword character chain pattern preparing means for preparing a first keyword character chain pattern of each pair of characters adjacent to each other in the code-added keyword produced by the keyword division code adding means, a second keyword character chain pattern of each pair of one division code and one character adjacent to the division code in the code-added keyword, and preparing a series of keyword character chain patterns by arranging the first and second keyword character chain patterns in the order of the characters and division codes in the code-added keyword;

data record retrieving means for extracting a series of particular character chain information corresponding to the series of keyword character chain patterns prepared by the keyword character chain pattern preparing means from the index file for the particular item prepared by the index file preparing means on condition that a plurality of data numbers in the pieces of particular character chain information agree with each other, a plurality of record numbers in the pieces of particular character chain information agree with each other and two occurrence frequencies of the same character indicated by each pair of particular character chain information agree with each other, judging that the keyword is included in a piece of particular data identified by both a particular data number and a particular record number common to the pieces of particular character chain information, and retrieving a particular data record identified by the particular record number from the data records stored in the data record storing means; and retrieved data record displaying means for displaying the particular data record retrieved by the data record retrieving means as a piece of retrieved information.

In the above configuration, a division code is added to both ends of a group of the pieces of data registered in the particular item and between each pair of data adjacent to each other in the group of the pieces of data for each data record. Therefore, each piece of data is placed between the division codes, so that starting and final characters of each piece of data can be identified. In this case, when pieces of character chain information corresponding to the first and second character chain patterns are prepared by the character chain information preparing means and an index file for the particular item is prepared by the index file preparing means, a piece of character chain information relating to one starting character of each piece of data or a piece of character chain information relating to one final character of each piece of data can be easily identified by identifying one division code of one second character chain pattern corresponding to the piece of character chain information.

Also, when a keyword is input by a user, because the division code is added to one end or both ends of the keyword by the keyword division code adding means, the division code is necessarily placed at the top or end of the keyword. Therefore, a starting character or a final character of the keyword can be identified. In this case, pieces of character chain information corresponding to the second character chain patterns are initially extracted from the index file as candidates for a piece of particular character chain information relating to the starting or final character of the keyword, and a series of particular character chain information corresponding to the series of keyword character chain patterns is extracted from the index file for the particular item on condition that a plurality of data numbers in the pieces of particular character chain information agree with each other, a plurality of record numbers in the pieces of particular character chain information agree with each other and two occurrence frequencies of the same character indicated by each pair of particular character chain information agree with each other. Therefore, the series of particular character chain information corresponding to the series of keyword character chain patterns can be reliably obtained at a high speed. Thereafter, a piece of data identified by both a particular data number and a particular record number common to the pieces of particular character chain information is judged as a piece of particular data including the keyword, a particular data record identified by the particular record number is retrieved from the data records, and the particular data record is displayed.

Accordingly, even though a plurality of pieces of data is registered in one item, because a piece of code-added data is prepared to divide each piece of data by the division codes placed both ends of the piece of data and pieces of character chain information corresponding to first and second character chain patterns obtained from the code-added data are listed as an index file, when a series of first and second keyword character chain patterns is produced from a code-added keyword obtained by adding the division code to one or both ends of a keyword, a piece of particular data including a keyword can be specified at a high speed by specifying a series of particular character chain information corresponding to the series of first and second keyword character chain patterns. Therefore, a particular data record relating to the piece of particular data can be retrieved at a high speed.

Also, the object is achieved by the provision of an information retrieval system, comprising:

data record storing means for storing a plurality of data records, pieces of data respectively composed of a plurality of characters being registered in a particular item of each data record;

division code adding means for adding a division code to both ends of a group of the pieces of data registered in the particular item and between each pair of data adjacent to each other in the group of the pieces of data for each data record to produce a piece of code-added data for each data record, each piece of data in the code-added data being placed between the division codes;

number allocating means for allocating a record number to each piece of data registered in each data record to identify the data records relating to the pieces of data and allocating a data number to each piece of data registered in the particular item of each data record to identify the pieces of data;

character occurrence frequency calculating means for calculating an occurrence frequency of each of a plurality of characters of one piece of data for each piece of data registered in the same particular item of the data records, an occurrence frequency of a current character in one piece of data indicating that at what frequency a character belonging to the same character type as that of the current character appears among characters placed between a top position of the piece of data and a current position of the current character;

character chain pattern preparing means for preparing a first character chain pattern of each pair of characters adjacent to each other and not adjacent to any division code in one code-added data produced by the division code adding means for each code-added data and preparing a second character chain pattern of each pair of characters adjacent to each other and adjacent to one division code in one code-added data produced by the division code adding means for each codeadded data;

character chain information preparing means for preparing a piece of character chain information corresponding to each of the first and second character chain patterns prepared by the character chain pattern preparing means according to the occurrence frequencies obtained by the character occurrence frequency calculating means and the data numbers and the record numbers allocated by the number allocating means, each piece of character chain information being composed of two occurrence frequencies of two characters of one piece of data corresponding to one first or second character chain pattern, one data number of the piece of data and one record number of the piece of data;

index file preparing means for preparing an index file for the particular item in which the pieces of character chain information prepared by the character chain information preparing means are listed in correspondence to the first and second character chain patterns prepared by the character chain pattern preparing means;

keyword preparing means for preparing a keyword composed of a plurality of characters;

keyword division code adding means for adding the division code to one end or both ends of the keyword prepared by the keyword preparing means to produce a piece of code-added keyword;

keyword character chain pattern preparing means for preparing a first keyword character chain pattern of each pair of characters adjacent to each other and not adjacent to any division code in the code-added keyword produced by the keyword division code adding means, preparing a second keyword character chain pattern of each pair of characters adjacent to each other and adjacent to one division code in the code-added keyword, and preparing a series of keyword character chain patterns by arranging the first and second keyword character chain patterns in the order of the characters and division codes in the code-added keyword;

data record retrieving means for extracting a series of particular character chain information corresponding to the series of keyword character chain patterns prepared by the keyword character chain pattern preparing means from the index file for the particular item prepared by the index file preparing means on condition that a plurality of data numbers in the pieces of particular character chain information agree with each other, a plurality of record numbers in the pieces of particular character chain information agree with each other and two occurrence frequencies of the same character indicated by each pair of particular character chain information agree with each other, judging that the keyword is included in a piece of particular data identified by both a particular data number and a particular record number common to the pieces of particular character chain information, and retrieving a particular data record identified by the particular record number from the data records stored in the data record storing means; and retrieved data record displaying means for displaying the particular data record retrieved by the data record retrieving means as a piece of retrieved information.

In the above configuration, any dividing code is not set as an element of the first or second character chain pattern. Also, any dividing code is not set as an element of the first or second keyword character chain pattern. Therefore, the number of first and second character chain patterns and the number of first and second keyword character chain patterns are decreased, a memory capacity of the index file preparing means can be lowered, and the retrieval of a particular record data can be performed at a higher speed.

BRIEF DESCRIPTION OF THE DRAWINGS

The objects, features and advantages of the present invention will be apparent from the following description taken in conjunction with the accompanying drawings, in which:

FIG. 3A shows pieces of data registered in an item 2 of a data record 1;

FIG. 3B shows a piece of code-added data produced from the data shown in FIG. 3A;

FIG. 3C shows a table of character occurrence frequencies in the code-added data calculated for each character type;

FIG. 3D shows an example of an index file in which pieces of character chain information corresponding to a character chain pattern are listed for each character chain pattern;

FIG. 4A shows a keyword input by a user;

FIG. 4B shows a code-added keyword produced from the keyword;

FIG. 4C shows a series of keyword character patterns prepared from the code-added keyword;

FIG. 6 shows a data structure of data records stored in a data record storing unit shown in FIG. 5;

FIG. 8 shows a general structure of an index file stored in an index file storing unit shown in FIG. 5;

FIG. 9A shows a keyword pattern 1 "af?" and a keyword pattern 2 "abad" input by a user;

FIG. 9B shows a first code-added keyword produced from the keyword pattern 1 and a second code-added keyword produced from the keyword pattern 2;

FIG. 9C shows a first series of keyword character patterns prepared from the first code-added keyword and a second series of keyword character patterns prepared from the second code-added keyword;

FIG. 9D shows a collating procedure performed to determine a series of particular character chain information corresponding to the first series of keyword character patterns;

FIG. 9E shows a collating procedure performed to determine a series of particular character chain information corresponding to the second series of keyword character patterns;

FIG. 9F shows a first retrieval result obtained for the keyword pattern 1 and a second retrieval result obtained for the keyword pattern 2;

FIG. 12 shows an example of data records stored in a data record storing unit shown in FIG. 11, code-added data, letter sets and letter set chain patterns according to the second embodiment;

FIG. 15 shows a collating procedure performed to determine a series of particular character chain information corresponding to the series of keyword character patterns shown in FIG. 4C;

FIG. 18A shows a table of character occurrence frequencies in the code-added data shown in FIG. 3B for each character type;

FIG. 18B shows an example of an index file in which pieces of character chain information corresponding to a character chain pattern are listed for each character chain pattern according to the fourth embodiment;

FIG. 20A shows a keyword input by a user;

FIG. 20B shows a code-added keyword produced from the keyword;

FIG. 20C shows a series of keyword character patterns prepared from the code-added keyword;

FIG. 20D shows a collating procedure performed to determine a series of particular character chain information corresponding to the series of keyword character patterns;

FIG. 20E shows a retrieval result obtained for the keyword shown in FIG. 20A;

FIG. 23A shows a hierarchy structure in which pieces of data are ranked to a plurality of hierarchy levels;

FIG. 23B shows a piece of code-added data produced from the pieces of data shown in FIG. 3A;

FIG. 23C shows an example of an index file in which pieces of character chain information corresponding to a plurality of character chain patterns prepared from the code-added data shown in FIG. 23B are listed for each hierarchy level according to the fifth embodiment;

FIG. 24 is a flow chart showing the retrieval of a piece of particular data including a keyword according to the fifth embodiment;

FIG. 25A shows a keyword and a particular hierarchy level of the keyword input by a user;

FIG. 25B shows a code-added keyword produced from the keyword according to its particular hierarchy level;

FIG. 25C shows a series of keyword character patterns prepared from the code-added keyword;

FIG. 26 shows pieces of data to which ordinal number codes are added according to an sequent order of the pieces of data;

FIG. 28 shows an example of an index file in which pieces of character chain information corresponding to character chain patterns prepared from the pieces of data shown in FIG. 26 are listed for each ordinal number code.

DETAILED DESCRIPTION OF THE EMBODIMENTS

Figures 1, 2:
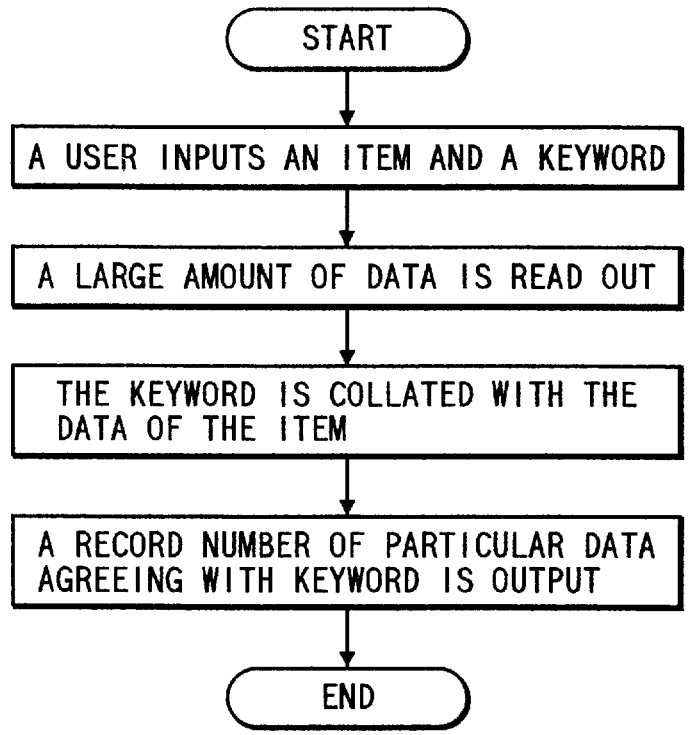
FIG. 1 shows data registered in a data base from which particular data is retrieved by a conventional information retrieval system.
FIG. 2 shows a flow chart showing a data retrieving procedure performed in the conventional information retrieval system.

Preferred embodiments of an information retrieval system according to the present invention are described with reference to drawings.

(First Embodiment)

As shown in FIGS. 3A and 3B, in cases where three pieces of data (or three character strings) "abcad, abad, afae" divided by a dividing symbol "," are registered in an item 2 of a data record indicated by a record number 1, the pieces of data are changed to a piece of code-added data "^Wabcad^Wabad^Wafae^W" by adding a division code "^W" to place each piece of data between the division codes and deleting the dividing symbol "," from each piece of data. In this case, data "abcad" is indicated by a data number 1, data "abad" is indicated by a data number 2, and data "afae" is indicated by a data number 3. Thereafter, an occurrence frequency of a character in one piece of data is calculated for each character of each piece of data. The occurrence frequency of a current character in one piece of data indicates that at what frequency a character belonging to the same character type as that of the current character appears among characters placed between a top position of the piece of data and a current position of the current character. Therefore, as shown in FIG. 3C, a list of character occurrence frequencies is obtained. For example, a character occurrence frequency equal to 1 indicates that a current character of a character type appears for the first time among a plurality of characters of the character type in one piece of code-added data, and a character occurrence frequency equal to 2 indicates that the occurrence of a current character of a character type is the second time among a plurality of characters of the character type in one piece of code-added data. Thereafter, a plurality of character chain patterns respectively indicating a set of two characters adjacent to each other are extracted by shifting the code-added data from its top to its end character by character.

For example, a plurality of character chain patterns (^W, a), (a,b), (b,c), (c,a), (a,d), (d,^W), (^W,a), (a,b), (b,a), (a,d), (d,^W), (^W,a), (a,f), (f,a), (a,e) and (e,^W) are extracted. Thereafter, character chain information composed of two character occurrence frequencies of two characters in each character chain pattern, a data number for the characters and a record number is prepared for each character chain pattern. For example, character chain information for the second character chain pattern (a,b) is expressed by (1,1,1,1) because the character occurrence frequency of the character "a" is 1, the character occurrence frequency of the character "b" is 1, the data number for the characters "a" and "b" is 1 and the record number is 1. Also, character chain information for the final character chain pattern (e,^W) is expressed by (1,m,3,1). Here, the character occurrence frequency of the division code "^W" is always expressed by "m". Thereafter, as shown in FIG. 3D, an index file for the item 2 of the data record 1, in which one or more pieces of character chain information corresponding to one character chain pattern are listed for each character chain pattern, is prepared.

Also, as shown in FIGS. 4A and 4B, when a keyword "afae" is input in a data retrieving operation, a code-added keyword "^Wafae^W" is produced from the keyword by adding the division code to both ends of the keyword. In this case, as described later in detail, because any symbol "?" is not added to any end of the keyword, the perfect character agreement retrieval is designated by the keyword. Thereafter, as shown in FIG. 4C, a series of keyword character chain patterns (^W,a), (a,f), (f,a), (a,e) and (e, ^W) for the code-added keyword is prepared. Thereafter, the index file is searched for pieces of character chain information corresponding to the keyword character chain patterns. The pieces of character chain information are treated as candidates for a series of particular character chain information corresponding to the series of keyword character chain patterns.

Thereafter, it is checked whether or not a particular character string agreeing with the keyword "afae" exists in the piece of data D1, D2 or D3 indicated by the data number 1, 2 or 3. In detail, in cases where the particular character string exists in the data D1, D2 or D3, conditions that pieces of particular character chain information have the same data number and the same record number and a value of a second element in one piece of particular character chain information corresponding to one keyword character chain pattern P1 agrees with a value of a first element in another piece of particular character chain information corresponding to a next keyword character chain pattern P2 following the keyword character chain pattern P1 are satisfied. Therefore, a series of particular character chain information is determined when the conditions are satisfied, and the record number corresponding to the particular character chain information is output.

Next, an information retrieval system, in which a record number corresponding to data including a keyword is output according to the above operation, is described.

Figure 5:
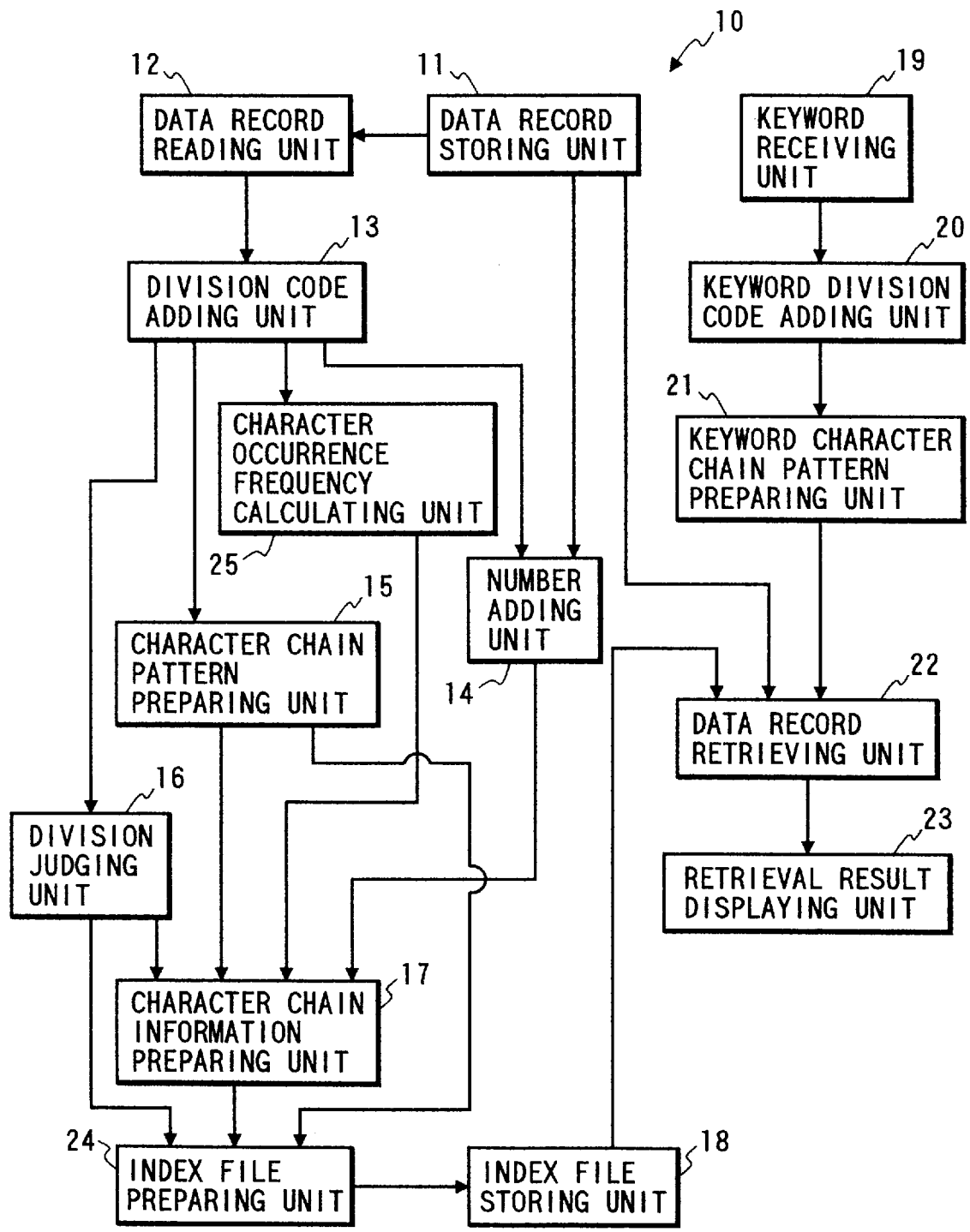
FIG. 5 is a block diagram of an information retrieval system according to a first embodiment of the present invention.

FIG. 5 is a block diagram of an information retrieval system according to a first embodiment of the present invention.

As shown in FIG. 5, an information retrieval system 10 comprises a data record storing unit 11 for storing a plurality of data records and record numbers identifying the data records, contents of each data record being indicated by pieces of data registered in each of a plurality of items;

a data record reading unit 12 for reading out each of the data records from the data record storing unit 11;

a division code adding unit 13 for extracting pieces of data divided by a division symbol "," from each item of the data records read out by the data record reading unit 12 and adding a division code "^W" to both ends of the pieces of data and between each pair of data adjacent to each other to produce a piece of code-added data for each item;

a number adding unit 14 for adding a data number to each piece of data of one piece of code-added data for each item, receiving the record numbers of the data records read out by the data record reading unit 12 from the data record storing unit 11, and adding one record number of one data record to pieces of code-added data relating to the data record for each data record;

a character occurrence frequency calculating unit 25 for calculating a character occurrence frequency of each character in one piece of data for each of the pieces of data of the items processed in the division code adding unit 13;

a character chain pattern preparing unit 15 for preparing a character chain pattern of each pair of characters adjacent to each other in one piece of code-added data for each piece of code-added data of the items while shifting the characters of each piece of code-added data one by one;

a division judging unit 16 for preparing a character chain pattern of each pair of one division code and one character adjacent to the division code in one piece of code-added data for each piece of code-added data of the items while shifting the characters of each piece of code-added data one by one;

a character chain information preparing unit 17 for preparing pieces of character chain information corresponding to the character chain patterns prepared in the character chain pattern preparing unit 15 and the division judging unit 16 according to the data numbers and the record numbers added in the number adding unit 14 and the character occurrence frequencies calculated in the character occurrence frequency calculating unit 25 on condition that each piece of character chain information corresponding to one character chain pattern is composed of two character occurrence frequencies of two characters of one piece of data or both one division code and one character of one piece of data, one data number of the piece of data and one record number of one data record of the piece of data;

an index file preparing unit 24 for preparing an index file of the pieces of character chain information relating to the same item of the data records for each item on condition that one or more pieces of character chain information corresponding to each of the character chain patterns prepared in the character chain pattern preparing unit 15 or the division judging unit 16 are listed in each index file; an index file storing unit 18 for storing the index file prepared in the index file preparing unit 24;

a keyword receiving unit 19 for receiving a keyword and a particular item input by a user and receiving a retrieval type such as a partial character agreement retrieval, a front character agreement retrieval, a rear character agreement retrieval or a perfect character agreement retrieval;

a keyword division code adding unit 20 for judging whether or not a retrieval type code "?" indicating the retrieval type exists in a top or bottom position of the keyword, detecting the retrieval type according to the existence of the retrieval type code and the position of the retrieval type code in the keyword, adding one or two division codes "^W" to the keyword received in the keyword receiving unit 19 according to the retrieval type to produce a code-added keyword;

a keyword character chain pattern preparing unit 21 for preparing a series of keyword character chain patterns from the code-added keyword to which the division codes are added in the keyword division code adding unit 20;

a data record retrieving unit 22 for judging whether or not a series of particular character chain information corresponding to the series of keyword character chain patterns prepared in the keyword character chain pattern preparing unit 21 is listed in the index file for the particular item stored in the index file storing unit 18 on condition that the data numbers in the particular character chain information agree with a particular data number, the record numbers in the particular character chain information agree with a particular record number and two occurrence frequencies of the same character indicated by each pair of particular character chain information agree with each other, judging that a piece of particular data including the keyword exists in the particular item of a particular data record identified by the particular record number and retrieving contents of the particular data record from the data record storing unit 11; and a retrieval result displaying unit 23 for displaying the contents of the particular data record retrieved in the data record retrieving unit 22 with an item number of the particular item, the particular data number and the particular record number as a retrieval result.

In the data record storing unit 11, as shown in FIG. 6, each data record is composed of a record number and pieces of data registered in each of a plurality of items. In this embodiment, it is assumed that a piece of particular data including a keyword exists in the item 2 of the data record 1 identified by the record number 1.

Figure 7:
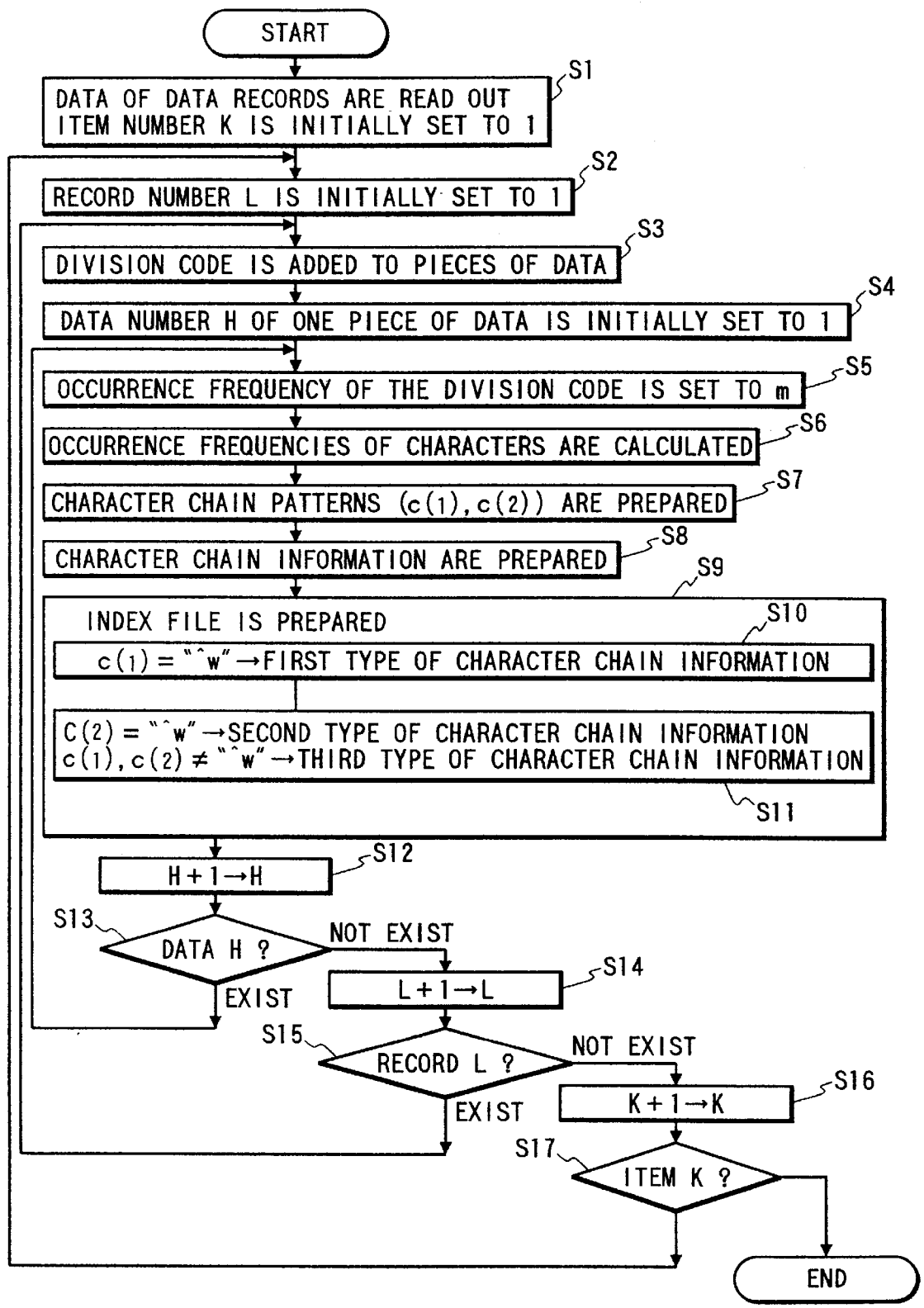
FIG. 7 is a flow chart showing the preparation of an index file prepared in an index file preparing unit shown in FIG. 5.

In the above configuration of the information retrieval system 10, a procedure for preparing an index file from the data records stored in the data record storing unit 11 is initially described with reference to FIG. 7.

In a step 1, pieces of data of the data records stored in the data record storing unit 11 are read out to the data record reading unit 12. Also, an item to be processed is 10 indicated by an item number K, and the item number K is initially set to 1.

In a step 2, a data record to be processed is indicated by a record number L. The record number L is initially set to 1. As shown in FIG. 3A, three pieces of data (or three character strings) "abcad, abad, afae" divided by the division symbol are, for example, registered in the item K=2 of the data record L=1.

In a step 3, in the division code adding unit 13, the division code "^W" is added to the pieces of data registered in the item K of the data record L to produce a piece of code-added data. In detail, the division code "^W" is added to both ends of the pieces of data and between each pair of data adjacent to each other. For example, a piece of code-added data "^Wabcad ^Wabad^Wafae^W" shown in FIG. 3B is obtained.

In a step 4, in the character occurrence frequency calculating unit 25, a data number of one piece of data in the code-added data of the item K of the data record L is set to H, and the data H is processed in following steps. For example, the data H=1 is "^Wabcad^W", the data H=2 is "^Wabad^W" and the data H=3 is "^Wafae^W". The data number H is initially set to 1.

In a step 5, an occurrence frequency F for each division code added to the data H is set to a number "m" in the character occurrence frequency calculating unit 25.

In a step 6, occurrence frequencies F of characters in the data H are calculated for each character type in the character occurrence frequency calculating unit 25. Therefore, the occurrence frequencies shown in FIG. 3C are obtained.

In a step 7, a character chain pattern (C(1),C(2)) is prepared in the character chain pattern preparing unit 15 for each pair of characters adjacent to each other in the data H. In this case, a character chain pattern relating to the division code is prepared in the division judging unit 16 for each division code.

In a step 8, the character occurrence frequencies obtained in the character occurrence frequency calculating unit 25, the character chain patterns obtained in the character chain pattern preparing unit 15 and the division judging unit 16 and the data number H and the record number L added in the number adding unit 14 are transmitted to the character chain information preparing unit 17, and pieces of character chain information corresponding to the character chain patterns are prepared by using the character occurrence frequencies, the data number H and the record number L.

In a step 9, an index file in which the character chain patterns and the character chain information are classified into types of the character chain information is prepared in the index file preparing unit 24. In this case, as shown in FIG. 8, the pieces of character chain information are classified into a first type of character chain information corresponding to character chain patterns in which the first element is the division code (C(1)=^W), a second type of character chain information corresponding to character chain patterns in which the second element is the division code (C(2)=^W) and a third type of character chain information corresponding to character chain patterns in which any division code is not included. Therefore, when a first element C(1) of one character chain pattern corresponding to one piece of character chain information is equal to the division code "^W", the piece of character chain information is stored in the storing unit 18 as the first type of character chain information with the character chain pattern in a step 10.

When a second element C(2) of one character chain pattern corresponding to one piece of character chain information is equal to the division code "^W", the piece of character chain information is classified as the second type of character chain information with the character chain pattern in a step 11. Also, when any element C(1) or C(2) of one character chain pattern corresponding to one piece of character chain information is not equal to the division code "^W", the piece of character chain information is classified as the third type of character chain information with the character chain pattern in the step 11. Thereafter, the index file is stored in the index file storing unit 18.

In a step 12, the data number H is incremented (H←H+1).

In a step 13, it is judged whether or not a piece of data indicated by the data number H exists in the item K. In cases where a piece of data H exists in the item K, the steps 5 to 12 are repeated to prepare pieces of character chain information for the data H of the item K of the record number L and store the pieces of character chain information in the storing unit 18. In contrast, in cases where a piece of data H does not exist in the item K, because all pieces of data of the item K of the record number L are processed in the steps 5 to 11, the record number L is incremented (L←L+1) in a step 14.

In a step 15, it is judged whether or not data of the data record L is read out to the data record reading unit 12. In cases where data of the data record L is read out to the data record reading unit 12, the steps 3 to 14 are repeated to store an index file for the item K of the data record L in the storing unit 18. In contrast, in cases where data of the data record L is not read out to the data record reading unit 12, because all pieces of data of the item K in all data records are processed in the steps 2 to 15, the preparation of the index file for the item K is completed. Therefore, an item number K is incremented (K←K+1) in a step 16.

In a step 17, it is judged whether or not data of the item K is read out to the data record reading unit 12. In cases where data of the item K is read out to the data record reading unit 12, the steps 2 to 16 are repeated to store an index file for the item K in the storing unit 18. In contrast, in cases where data of the item K is not read out to the data record reading unit 12, because pieces of data of all items of all data records are processed in the steps 2 to 16, the preparation of the index files is completed, and the index file shown in FIG. 8 is obtained.

Next, a processing procedure, in which a piece of particular data including a character string agreeing with a keyword input by the user is retrieved from the data records by using the index file and a particular data record corresponding to the particular data is extracted from the data records stored in the data record storing unit 11, is described with reference to FIGS. 9 and 10.

As shown in FIG. 9A, a keyword pattern 1 "af?" and a keyword pattern 2 "abad" input by the user are, for example, received in the keyword receiving unit 19. A retrieval type code "?" added after the characters in the keyword pattern 1 "af?" indicates the front character agreement retrieval. Therefore, the keyword pattern 1 "af?" denotes the retrieval of a character string having characters "af" in its front portion. For example, a character string "afae" is retrieved by using the keyword pattern 1 "af?". Also, in cases where any symbol "?" is not included in a keyword, the perfect character agreement retrieval is selected, and a character string perfectly agreeing with the keyword is retrieved. For example, a character string "abad" is retrieved by using the keyword pattern 2 "abad".

Figure 10:
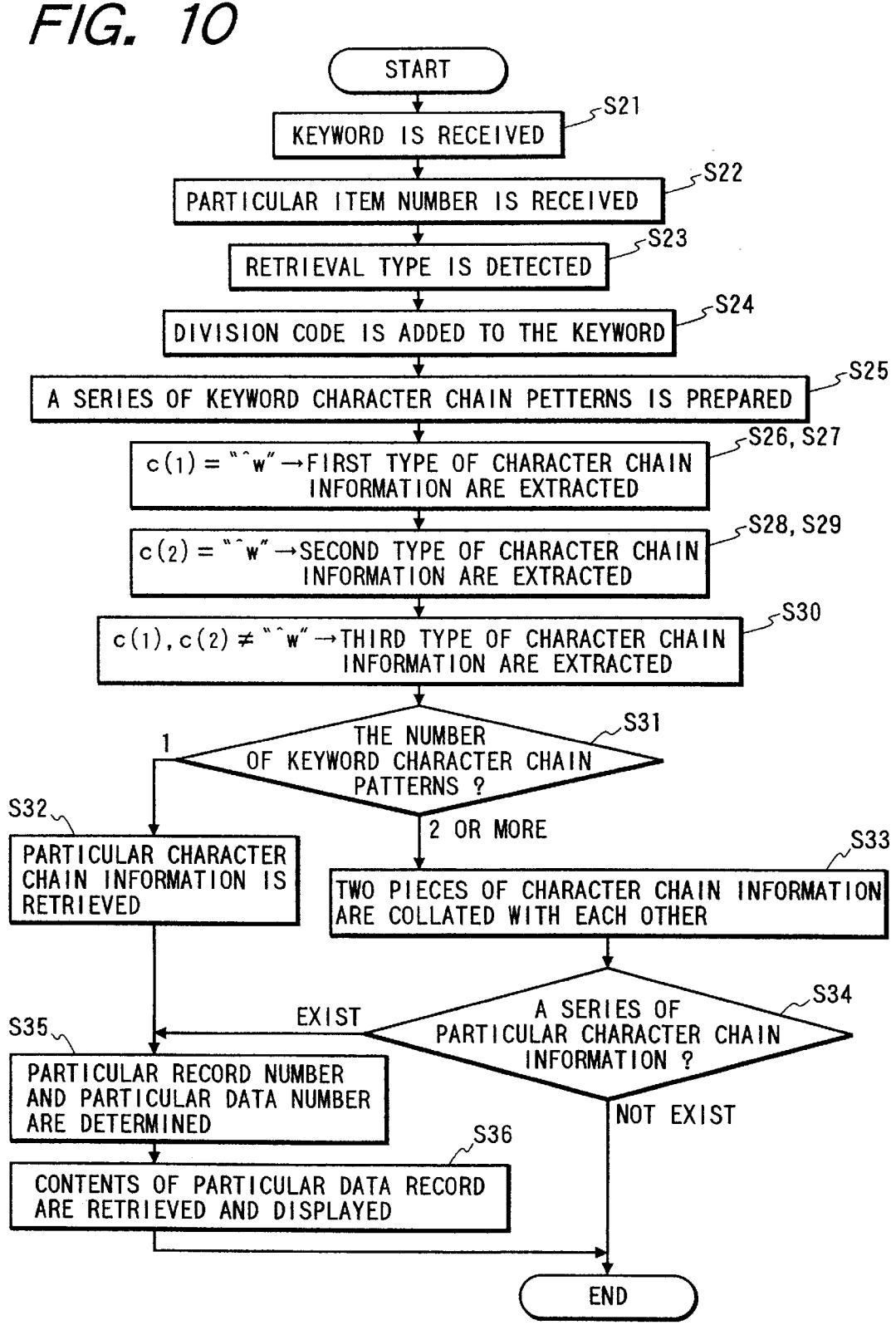
FIG. 10 is a flow chart showing the retrieval of a piece of particular data including a keyword according to the first embodiment.

As shown in FIG. 10, in a step 21, a keyword with a retrieval type is received in the keyword receiving unit 19. For example, a keyword having the pattern 1 "af?" or a keyword having the pattern 2 "abad" is input.

In a step 22, a particular item number input by the user is received in the keyword receiving unit 19, so that an index file relating to a particular item indicated by the particular item number is searched in a following procedure.

In a step 23, in the keyword division code adding unit 20, the retrieval type (a partial character agreement retrieval, a front character agreement retrieval, a rear character agreement retrieval or a perfect character agreement retrieval) is detected according to the existence of the retrieval type code and the position of the retrieval type code in the keyword. Therefore, in case where the keyword pattern 1 is input, the front character agreement retrieval is detected. Also, in case where the keyword pattern 2 is input, the perfect character agreement retrieval is detected.

In a step 24, a division code "^W" is added to the keyword according to the retrieval type to prepare a code-added keyword. As shown in FIG. 9B, the division code "^W" is added to both ends of the keyword "afae" in case of the perfect character agreement retrieval, and the division code "^W" is added to a top of the keyword "af?", at which any retrieval type code does not exists, in case of the front character agreement retrieval.

In a step 25, a series of keyword character chain patterns is prepared from the code-added keyword in the keyword character chain pattern preparing unit 21. For example, as shown in FIG. 9C, a series of keyword character chain patterns (^W,a) and (a,f) is prepared from the keyword pattern 1, and a series of keyword character chain patterns (^W,a), (a,b), (b,a), (a,d) and (d, ^W) is prepared from the keyword pattern 2.

In steps 26 to 35, in the data record retrieving unit 22, a particular index file for the particular item identified by the particular item number is specified, and a series of particular character chain information corresponding to the series of keyword character chain patterns is extracted from the particular index file stored in the index file storing unit 18.

In cases where a first element C(1) of one keyword character chain pattern (C(1),C(2)) is the division code (step 26), all pieces of character chain information corresponding to the keyword character chain pattern are extracted from among the first type of pieces of character chain information in the step 27. In cases where a second element C(2) of one keyword character chain pattern (C(1),C(2)) is the division code (step 28), all pieces of character chain information corresponding to the keyword character chain pattern are extracted from the second type of pieces of character chain information in the step 29. In cases where any element of one keyword character chain pattern (C(1),C(2)) is not the division code, all pieces of character chain information corresponding to the keyword character chain pattern are extracted from the third type of pieces of character chain information in the step 30.

In a step 31, it is judged whether the number of keyword character chain patterns prepared in the step 25 is one or more. In cases where only one keyword character chain pattern is prepared in the step 25, one piece of character chain information corresponding to the keyword character chain pattern is set as a piece of particular character chain information corresponding to the keyword character chain pattern in a step 32.

In contrast, in cases where a plurality of keyword character chain patterns are prepared in the step 25, two pieces of character chain information corresponding to a pair of keyword character chain patterns adjacent to each other are collated with each other. In detail, each of the pieces of character chain information corresponding to a first keyword character chain pattern is collated with one piece of character chain information corresponding to a second keyword character chain pattern following the first keyword character chain pattern, and a piece of particular character chain information corresponding to the first keyword character chain pattern is selected from the pieces of character chain information on condition that the piece of particular character chain information has the same data number and the same record number as those of one piece of character chain information corresponding to the second keyword character chain pattern and a value of a second element in the particular character chain information agrees with a value of a first element in the piece of character chain information corresponding to the second keyword character chain pattern (step 33).

In a step 34, it is judged whether or not at least one series of particular character chain information corresponding to the series of keyword character chain patterns exists. In cases where at least one series of particular character chain information exists, a particular record number and a particular data number corresponding to one series of particular character chain information are determined in the data record retrieving unit 22 for each series of particular character chain information (step 35). Thereafter, because the keyword is included in a piece of particular data identified by the particular data number, the particular item number and the particular record number, contents of a particular data record identified by the particular record number is retrieved from the data record storing unit 11 and are displayed in the retrieval result displaying unit 23 as retrieved information with the particular record number, the particular item number and the particular data number for each series of particular character chain information (step 36).

For example, as shown in FIG. 9D, in cases where the keyword pattern 1 "af?" is input, three pieces of character chain information (m,1,1,1), (m,1,2,1) and (m,1,3,1) corresponding to a first keyword character chain pattern (^W,a) are extracted, and one piece of character chain information (1,1,3,1) corresponding to a second keyword character chain pattern (a,f) are extracted. Thereafter, the first character chain information (m,1,1,1) is collated with the piece of character chain information (1,1,3,1). Because the data number in the character chain information (m,1,1,1) does not agree with that in the piece of character chain information (1,1,3,1), the second character chain information (m,1,2,1) is collated with the piece of character chain information (1,1,3,1). Because the data number in the character chain information (m,1,2,1) does not agree with that of the piece of character chain information (1,1,3,1), the third character chain information (m,1,3,1) is collated with the piece of character chain information (1,1,3,1). Because the character chain information (m,1,3,1) matches with the piece of character chain information (1,1,3,1), the character chain information (m,1,3,1) is selected as one piece of particular character chain information corresponding to the first keyword character chain pattern (^W,a), and the piece of character chain information (1,1,3,1) is selected as one piece of particular character chain information corresponding to the second keyword character chain pattern (a,f). Thereafter, a particular record number L=1, a particular item number K=2 and a particular data number H=3 are extracted. Thereafter, as shown in FIG. 9F, contents of the data record L=1 are displayed with the particular record number L=1, the particular item number K=2 and the particular data number H=3.

Also, as shown in FIG. 9E, in cases where the keyword pattern 2 "abad" is input, three pieces of first character chain information (m,1,1,1), (m,1,2,1) and (m,1,3,1) corresponding to a first keyword character chain pattern (^W,a), two pieces of second character chain information (1,1,1,1) and (1,1,2,1) corresponding to a second keyword character chain pattern (a,b), a piece of third character chain information (1,2,2,1) corresponding to a third keyword character chain pattern (b,a), two pieces of fourth character chain information (2,1,1,1) and (2,1,2,1) corresponding to a fourth keyword character chain pattern (a,d) and two pieces of fifth character chain information (1,m,1,1) and (1,m,2,1) corresponding to a fifth keyword character chain pattern (d,^W) are extracted. Thereafter, each of the three pieces of first character chain information is collated with the two pieces of second character chain information, and a pair of pieces of character chain information (m,1,1,1) and (1,1,1,1) and another pair of pieces of character chain information (m,1,2,1) and (1,1,2,1) are selected as candidates for particular character chain information. Thereafter, each of the two pieces of second character chain information is collated with the piece of third character chain information, and a series of character chain information (m,1,2,1), (1,1,2,1) and (1,2,2,1) are selected as candidates for particular character chain information. Thereafter, the piece of third character chain information is collated with the two pieces of fourth character chain information, and a series of character chain information (m,1,2,1), (1,1,2,1), (1,2,2,1) and (2,1,2,1) are selected as candidates for particular character chain information. Thereafter, the fourth character chain information (2,1,2,1) is collated with each of the two pieces of fifth character chain information, and a series of character chain information (m,1,2,1), (1,1,2,1), (1,2,2,1), (2,1,2,1) and (1,m,2,1) are finally selected as a series of particular character chain information. Thereafter, a particular record number L=1, a particular item number K=2 and a particular data number H=2 are extracted. Thereafter, as shown in FIG. 9F, contents of the data record L=1 are displayed with the particular record number L=1, the particular item number K=2 and the particular data number H=2.

Therefore, in the information retrieval system 10, the division code "^W" is added to both ends of the pieces of data registered in each item K of each data record and between each pair of data adjacent to each other to prepare one piece of code-added data, one series of character chain patterns is prepared from the code-added data for each item and each data record, one series of character chain information is prepared from the series of character chain patterns for each item and each data record, and the particular index file in which the character chain patterns and the character chain information are listed is prepared in advance for each item and each data record. Thereafter, when a keyword is input, one or two division codes are added to the keyword to prepare a code-added keyword, a series of keyword character chain patterns is prepared from the code-added keyword, pieces of character chain information corresponding to the keyword character chain patterns are extracted from the index file and are collated with each other, and at least one piece of particular data including the keyword is detected.

Accordingly, even though pieces of data are registered in one item, because the division codes are added to both ends of the pieces of data registered in one item and between each pair of data adjacent to each other, each piece of data can be identified in the keyword retrieval, so that a piece of data including the keyword can be reliably detected.

Also, because all pieces of character chain information listed in the index file are not read out but a limited number of pieces of character chain information corresponding to each keyword character chain pattern are read out and collated with each other, a retrieving time can be considerably shortened.

In the first embodiment, each piece of data is composed of a plurality of characters. However, this embodiment is not limited to the characters. For example, patterned symbols such as Δ, □ and ○ can be useful for each piece of data.
(Second Embodiment)

In this embodiment, the preparation of an index file and the retrieval of a piece of particular data including a keyword are performed in an information retrieval system on condition that each piece of data registered in one item of one data record is composed of a plurality of words expressed by letters used in Europe or America and each pair of adjacent words is divided by a space.

Figure 11:
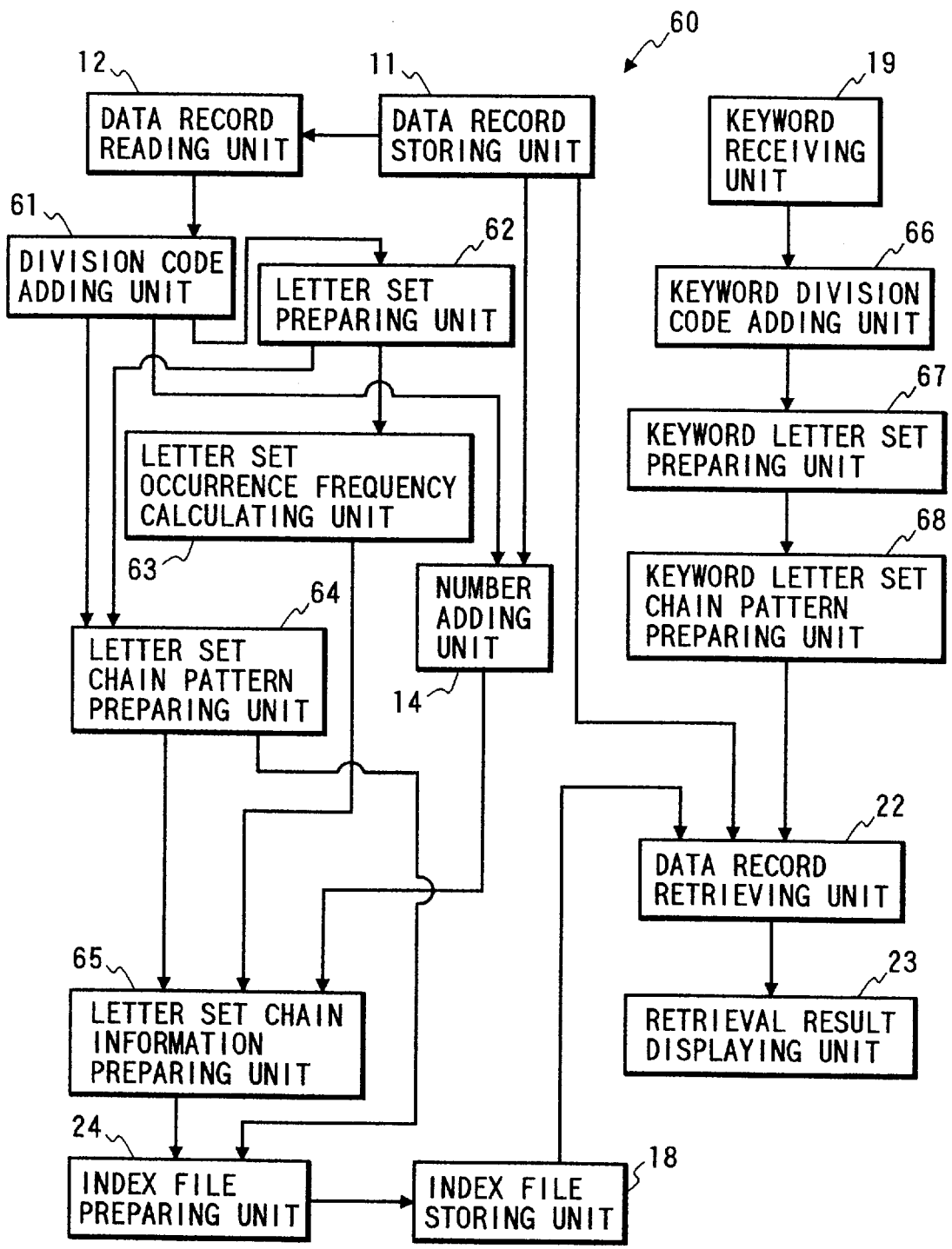
FIG. 11 is a block diagram of an information retrieval system according to a second embodiment of the present invention.

FIG. 11 is a block diagram of an information retrieval system according to a second embodiment of the present invention.

As shown in FIG. 11, an information retrieval system 60 comprises the data record storing unit 11, the data record reading unit 12, the number adding unit 14, the character chain pattern preparing unit 15,

- a division code adding unit 61 for extracting pieces of data divided by dividing symbols "," from each item of the data record read out by the data record reading unit 12, counting a data number for each piece of data, and adding a division code "^W" to both ends of the pieces of data and between each pair of data adjacent to each other, on condition that two spaces are added between a top letter of each piece of data and the division code "^W" added to a head position of the piece of data, to produce a piece of code-added data for each item,
- a letter set preparing unit 62 for dividing a plurality of letters of each code-added data, in which the space added to each piece of data in the division code adding unit 61, a space originally placed between each pair of adjacent words in each piece of data and the division codes "^W" are regarded as letters, to a plurality of letter sets respectively composed of one pair of adjacent letters on condition that one division code "^W" is added to an end position of one piece of codeadded data in cases where the number of letters in the codeadded data is odd,
- a letter set occurrence frequency calculating unit 63 for calculating an occurrence frequency of one letter set in each piece of data,
- a letter set chain pattern preparing unit 64 for preparing a letter set chain pattern of each pair of letter sets adjacent to each other in one piece of code-added data for each piece of code-added data of the items,
- a letter set chain information preparing unit 65 for preparing pieces of letter set chain information corresponding to the letter set chain patterns prepared in the letter set chain pattern preparing unit 64 according to the data numbers and the record numbers added in the number adding unit 14 and the letter occurrence frequencies calculated in the letter set occurrence frequency calculating unit 63, the index file preparing unit 24, the index file storing unit 18, the keyword receiving unit 19,

- a keyword division code adding unit 66 for judging whether or not a retrieval type code "?" indicating the retrieval type exists in a top or bottom position of the keyword, detecting the retrieval type according to the existence of the retrieval type code and the position of the retrieval type code in the keyword, adding one or two division codes "^W" to the keyword received in the keyword receiving unit 19 according to the retrieval type, on condition that two spaces are added between a top letter of the keyword and the division code "^W" added to a head position of the keyword, to prepare a code-added keyword,
- a keyword letter set preparing unit 67 for dividing a plurality of letters of the code-added keyword, in which the space added in the keyword division code adding unit 66 and the division codes "^W" are included, to a plurality of keyword letter sets respectively composed of one pair of adjacent letters on condition that one division code "^W" is added to an end position of the code-added keyword in cases where the number of letters in the code-added keyword is odd,
- a keyword letter set chain preparing unit 68 for preparing a series of keyword letter set chain patterns respectively composed of one pair of keyword letter sets adjacent to each other, the data record retrieving unit 22, and the retrieval result displaying unit 23.

In the above configuration of the information retrieval system 60, the preparation of an index file and the retrieval of a piece of particular data including a keyword are described.

As shown in FIG. 12, in cases where a piece of first data "Abe Lincoln" and a piece of second data "Bill Clinton" divided by the dividing symbol "," are, for example, registered in the item 2 of the data record 1, the division code "^W" is added to the top of the first data and the bottom of the second data, two spaces are added between the division code "^W" and the top of each piece of data, so that a piece of code-added data "^W Abe Lincoln ^W Bill Clinton ^W" is produced in the division code adding unit 61. Thereafter, a plurality of letter sets respectively composed of one pair of adjacent letters are prepared in the letter set preparing unit 62 by dividing a plurality of letters of the code-added data. In this case, the space added to the pieces of data, a space originally placed between each pair of adjacent words in each piece of data and the division codes "^W" are included.

For example, a plurality of letter sets (^W,□), (□,A), (b,e), (□,L), (i,n), (c,o), (l,n), (^W,□), (□B), (i,l), (l,□), (□,c), (l,i), (n,t), (o,n) and (^W,^W) are prepared. Here a symbol "□" denotes a space.

Thereafter, an occurrence frequency of one letter set in each piece of data is calculated in the letter set occurrence frequency calculating unit 63. Also, a letter set chain pattern of each pair of letter sets adjacent to each other is prepared in the letter set chain pattern preparing unit 64 in the code-added data. For example, a plurality of letter set chain patterns {(^W,□)(□,A)}, {(□,A)(b,e)}, {(b,e)(□,L)}, {(□,L)(i,n)}, {(i,n)(c,o)}, {(c,o)(l,n)}, {(l,n)(^W,□)}, {(^W,□)(□,B)}, {(□,B)(i,l)}, (i,l)(l,□)}, {(l,□)(□,c)}, {(□,C)(l,i)}, {(l,i)(n,t)}, {(n,t)(o,n)} and {(o,n)(^W,^W)} are prepared. Thereafter, pieces of letter set chain information corresponding to the letter set chain patterns are prepared in the letter set chain information preparing unit 65 according to the data numbers and the record numbers added in the number adding unit 14 and the letter occurrence frequencies calculated in the letter set occurrence frequency calculating unit 63. For example, a piece of letter set chain information corresponding to the third letter set chain pattern {(b,e)(☐,L)} is expressed by (1,1,1,1) because an occurrence frequency of the letter set (b,e) is 1 and an occurrence frequency of the letter set (☐,L) is 1. Also, a piece of letter set chain information corresponding to the final letter set chain pattern {(o,n)(^W,^W)} is expressed by (1,1,2,1). Thereafter, an index file is prepared and stored in the same manner as in the first embodiment.

When a keyword "Abe" is input to the keyword receiving unit 19, a code-added keyword "^W Abe^W" is prepared in the keyword division code adding unit 66, a plurality of keyword letter set chain patterns (^W,☐), (☐,A), (b,e) and (^W,^W) are prepared in the keyword letter set preparing unit 67, and a plurality of keyword letter set chain patterns {(^W,☐)(☐,A)}, {(☐,A)(b,e)} and {(b,e)(^W, ^W)} are prepared in the keyword letter set chain preparing unit 68. Thereafter, a series of particular letter set chain information corresponding to a series of keyword letter set chain patterns {(^W,☐)(☐,A)}{(☐,A)(b,e)} and {(b,e)(^W,^W)} is extracted from the index file in the data record retrieving unit 22, and the record number L=1, the item number K=2, the data number H=1 and contents of the first data are displayed.

Also, when a keyword "Lincoln" is input to the keyword receiving unit 19, a code-added keyword "^W Lincoln^W" is prepared in the keyword division code adding unit 66, a plurality of keyword letter set chain patterns (^W,☐), (☐,L), (i,n), (c,o), (l,n) and (^W, ^W) are prepared in the keyword letter set preparing unit 67, and a plurality of keyword letter set chain patterns {(^W,☐)(☐,L)}, {(☐,L)(i,n)}, {(i, n)(c,o)}, {(c,o)(l,n)} and {(l,n)(^W,^W)}. Thereafter, a series of particular letter set chain information corresponding to a series of keyword letter set chain patterns {(^,☐)(☐,L)}, {(☐,L)(i, n)}, {(i,n)(c,o)}, {(c,o)(l,n)} and {(l,n)(^W, ^W)} is extracted from the index file in the data record retrieving unit 22, and the record number L=1, the item number K=2, the data number H=1 and contents of the first data are displayed.

Accordingly, because a letter string of each piece of data is divided into a plurality of letter sets respectively composed of a plurality of successive letters, each of a plurality of letter set chain patterns is prepared by combining a plurality of letter sets adjacent to each other and pieces of letter set chain information corresponding to the letter set chain patterns are prepared, the number of letter set chain patterns can be decreased, and a small sized index file can be prepared. Therefore, a retrieval time can be shortened.

Next, a case that a plurality of keywords are input to the keyword receiving unit 19 is described.

For example, a piece of first data "Yokohama", a piece of second data "Chinese town" and a piece of third data "Yamashita park" are registered in the item 2 of the data record 1, and an index file for various item including the item 2 is stored in the index file storing unit 18. When, a plurality of keywords "Yokohama" & "Chinese town" connected by a symbol "&" are input to the keyword receiving unit 19, a first group of items including the item 2 of the record data 1 are extracted according to the first keyword "Yokohama". Thereafter, a second group of items including the item 2 of the record data 1 are extracted according to the second keyword "Chinese town". Thereafter, the item 2 of the record data 1 common to the first and second groups of items is displayed with contents of the first and second data.

(Third Embodiment)

In this embodiment, pieces of character chain information corresponding to a plurality of keyword character chain patterns are collated with each other in the reverse order of the arrangement of characters of a keyword. Therefore, an information retrieval system according to this embodiment is useful for the rear character agreement retrieval or the perfect character agreement retrieval.

Figure 13:
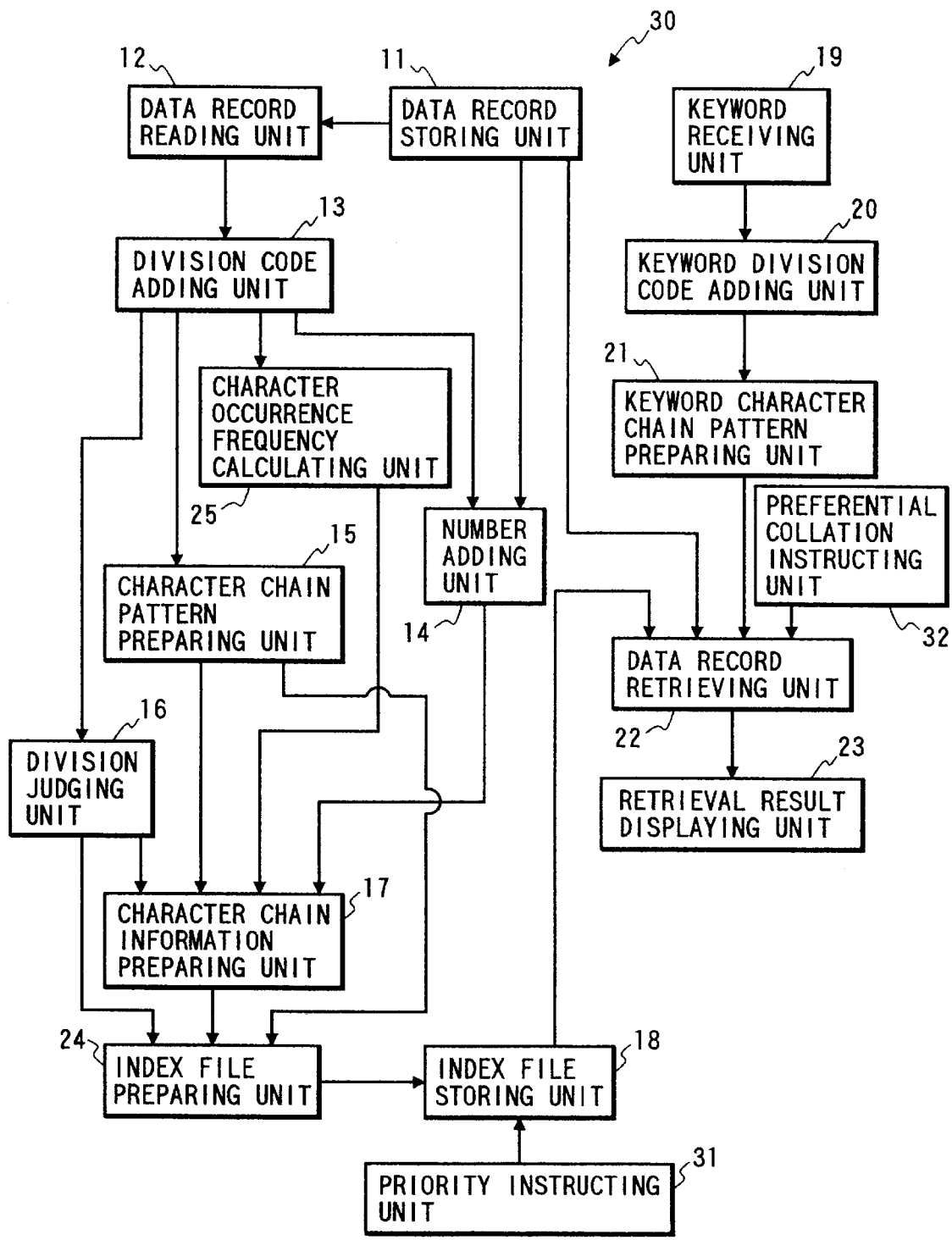
FIG. 13 is a block diagram of an information retrieval system according to a third embodiment of the present invention.

FIG. 13 is a block diagram of an information retrieval system according to a third embodiment of the present invention.

As shown in FIG. 13, an information retrieval system 30 comprises the data record storing unit 11, the data record reading unit 12, the division code adding unit 13, the number adding unit 14, the character occurrence frequency calculating unit 25, the character chain pattern preparing unit 15, the division judging unit 16, the character chain information preparing unit 17, the index file preparing unit 24, the index file storing unit 18, the keyword receiving unit 19, the keyword division code adding unit 20, the keyword character chain pattern preparing unit 21, the data record retrieving unit 22, the retrieval result displaying unit 23, a priority instructing unit 31 for instructing the index file storing unit 18 to store one or more pieces of second type character chain information, which are prepared in the character chain information preparing unit 17 and correspond to one or more specific character chain patterns (C(1), C(2)) in which the second elements C(2) are the division codes "^W", at preferential reading-out positions to preferentially retrieved the second type character chain information from the index file storing unit 18, and a preferential collation instructing unit 32 for instructing the data record retrieving unit 22 to preferentially collate each piece of second type character chain information corresponding to a specific keyword character chain pattern with one piece of character chain information corresponding to a keyword character chain pattern preceding the specific keyword character chain pattern in a series of keyword character chain patterns.

In the above configuration of the information retrieval system 30, after an index file is prepared in the index file preparing unit 24 in the same manner as in the first embodiment, one or more pieces of second type character chain information of the index file corresponding to one or more specific character chain patterns (C(1), C(2)), in which the second elements C(2) are the division codes "^W", are stored at preferential reading-out positions of the index file storing unit 18 under the control of the priority instructing unit 31. Therefore, when a data retrieval in which one or more pieces of particular data including a keyword are retrieved is performed, the pieces of second type character chain information can be preferentially retrieved.

Figure 14:
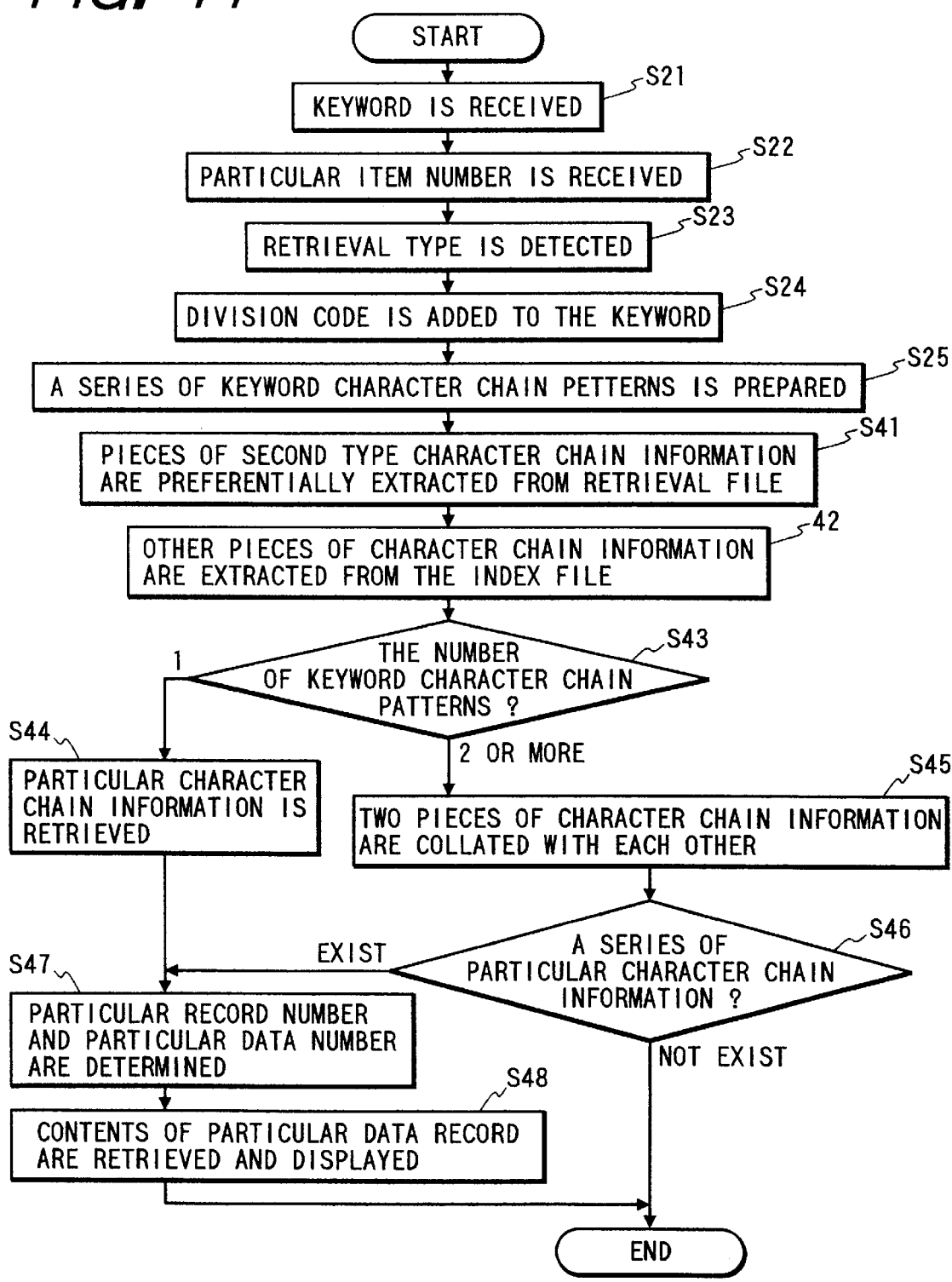
FIG. 14 is a flow chart showing the retrieval of a piece of particular data including a keyword according to the third embodiment.

Thereafter, the data retrieval is performed according to a flow chart shown in FIG. 14. When a keyword is input by the user and an item K is designated by the user, the keyword is received in the keyword receiving unit 19 and the steps 21 to 25 are performed in the same manner as in the first embodiment. For example, when a keyword "afae" designating the perfect character agreement retrieval (refer to FIG. 4A) is input by the user, as shown in FIG. 4C, a plurality of keyword character chain patterns (^W,a), (a,f), (f,a), (a,e) and (e,^W) arranged in that order is prepared from the code-added keyword.

In steps 41 to 45, in the data record retrieving unit 22, a series of particular character chain information corresponding to the series of keyword character chain patterns is extracted from the index file stored in the index file storing unit 18 under the control of the preferential collation instructing unit 32.

In detail, pieces of second type character chain information corresponding to a specific keyword character chain pattern of which a second element is the division code "^W" are preferentially extracted from the index file (step 41). Thereafter, other pieces of character chain information corresponding to each of other keyword character chain patterns are extracted from the index file in the reverse order of the arrangement of the keyword character chain patterns (step 42).

In a step 43, it is judged whether the number of keyword character chain patterns prepared in the step 25 is one or more. In cases where only one keyword character chain pattern is prepared in the step 25, one piece of character chain information corresponding to the keyword character chain pattern is set as a piece of particular character chain information corresponding to the keyword character chain pattern in a step 44.

In contrast, in cases where a plurality of keyword character chain patterns are prepared in the step 25, the procedure proceeds to a step 45. In the step 45, each piece of second type character chain information corresponding to the specific keyword character chain pattern is collated with one piece of character chain information corresponding to one keyword character chain pattern adjacent to the specific keyword character chain pattern, and a piece of particular second type character chain information corresponding to the specific keyword character chain pattern is selected from the pieces of second type character chain information on condition that the piece of particular second type character chain information has the same data number and the same record number as those of the piece of collated character chain information and a value of a first element in the particular second type character chain information agrees with a value of a second element in the piece of collated character chain information. Thereafter, each pair of character chain information corresponding to first and second character chain patterns adjacent to each other are collated with each other in the reverse order of the arrangement of the keyword character chain patterns, and a piece of particular character chain information corresponding to the first keyword character chain pattern arranged after the second keyword character chain pattern is selected from the pieces of character chain information for each keyword character chain pattern on condition that the piece of particular character chain information has the same data number and the same record number as those of one piece of character chain information corresponding to the second keyword character chain pattern and a value of a first element in the particular character chain information agrees with a value of a second element in the piece of character chain information corresponding to the second keyword character chain pattern.

For example, a piece of second type character chain information (1,m,3,1) corresponding to the specific keyword character chain pattern (e,^W) is preferentially extracted, and a piece of character chain information (2,1,3,1) corresponding to the keyword character chain pattern (a,e), a piece of character chain information (1,2,3,1) corresponding to the keyword character chain pattern (f,a), a piece of character chain information (1,1,3,1) corresponding to the keyword character chain pattern (a,f) and pieces of character chain information (m,1,1,1), (m,1,2,1) and (m,1,3,1) corresponding to the keyword character chain pattern (^W,a) are extracted in that order. Thereafter, as shown in FIG. 15, the second type character chain information (1,m,3,1) is collated with the character chain information (2,1,3,1), and the pieces of character chain information (1,m,3,1) and (2,1,3,1) are set as candidates for pieces of particular character chain information because a value C(1)=1 the first element of the second type character chain information (1, m,3,1) equals to that of the second element of the character chain information (2,1,3,1) and the record number L=1 and the data number H=3 of the second type character chain information (1,m, 3,1) agree with those of the character chain information (2,1,3,1). Thereafter, the character chain information (2,1, 3,1) is collated with the character chain information (1,2,3, 1), and the character chain information (1,2,3,1) is set as a candidate for a piece of particular character chain information. Thereafter, the character chain information (1,2,3,1) is collated with the character chain information (1,1,3,1), and the character chain information (1,1,3,1) is set as a candidate for a piece of particular character chain information. Thereafter, the character chain information (1,1,3,1) is collated with each of the pieces of character chain information (m,2,1,1), (m,1,2,1) and (m,1,3,1), and the character chain information (m,1,3,1) is set as a candidate for a piece of particular character chain information. Thereafter, the pieces of character chain information (1,m,3,1), (2,1,3,1), (1,2,3,1), (1,1,3,1) and (m,1,3,1) are selected as a series of particular character chain information.

Thereafter, it is judged whether or not at least one series of particular character chain information corresponding to the series of keyword character chain patterns exists (step 46). In cases where at least one series of particular character chain information exists, a particular record number and a particular data number corresponding to one series of particular character chain information are extracted in the data record retrieving unit 22 for each series of particular character chain information (step 47). Thereafter, because the keyword is included in a piece of particular data of the particular data number which is registered in the particular item of a particular data record identified by the particular record number, the particular data record is retrieved from the data record storing unit 11, contents of the particular data record are displayed in the retrieval result displaying unit 23 with the particular record number, the particular item number and the particular data number for each series of particular character chain information (step 48).

Accordingly, because each piece of second type character chain information is preferentially collated with one piece of character chain information and the collation of the pieces of character chain information is performed in the reverse order of the arrangement of the keyword character chain patterns, the rear character agreement retrieval can be performed at a high speed.

In this embodiment, each piece of second type character chain information is preferentially collated with one piece of character chain information. However, it is applicable that each piece of first type character chain information corresponding to one or more specific character chain patterns (C(1), C(2)) in which the first elements C(1) are the division codes "^W" be preferentially collated with one piece of character chain information and the collation of the pieces of character chain information be performed in the arranging order of characters of a keyword. In this case, the front character agreement retrieval can be performed at a high speed.

(Fourth Embodiment)

In this embodiment, when an index file is prepared, two successive characters C(1)C(2) following one division code "^W" in one piece of code-added data are set as a front code-added character chain ^WC(1)C(2), two successive characters C(3)C(4) preceding one division code "^W" in one piece of code-added data are set as a rear code-added character chain C(3)C(4)^W, the front code-added character chain is indicated by a front code-added character chain pattern (C(1),C(2)) in place of a pair of character chain patterns (^W,C(1)) and (C(1),C(2)), the rear code-added character chain is indicated by a rear code-added character chain pattern (C(3),C(4) in place of a pair of character chain patterns (C(3),C(4)) and (C(4),^W), a piece of character chain information corresponding to the front code-added character chain pattern is indicated by a piece of front code-added character chain information (F(1),F(2),H,L) in place of a pair of character chain information (m,F(1),H,L) and (F(1),F(2),H,L), a piece of character chain information corresponding to the rear code-added character chain pattern is indicated by a piece of rear code-added character chain information (F(3),F(4),H,L) in place of a pair of character chain information (F(3),F(4),H,L) and (F(4),m,H,L), the front code-added character chain pattern and the front code-added character chain information are listed as a front code-added group in an index file, and the rear code-added character chain pattern and the rear code-added added character chain information are listed as a rear code-added added group in the index file. Therefore, because the number of character chain patterns and the number of character chain information listed in the index file can be decreased, a data retrieval can be performed at a high speed.

Figure 16:
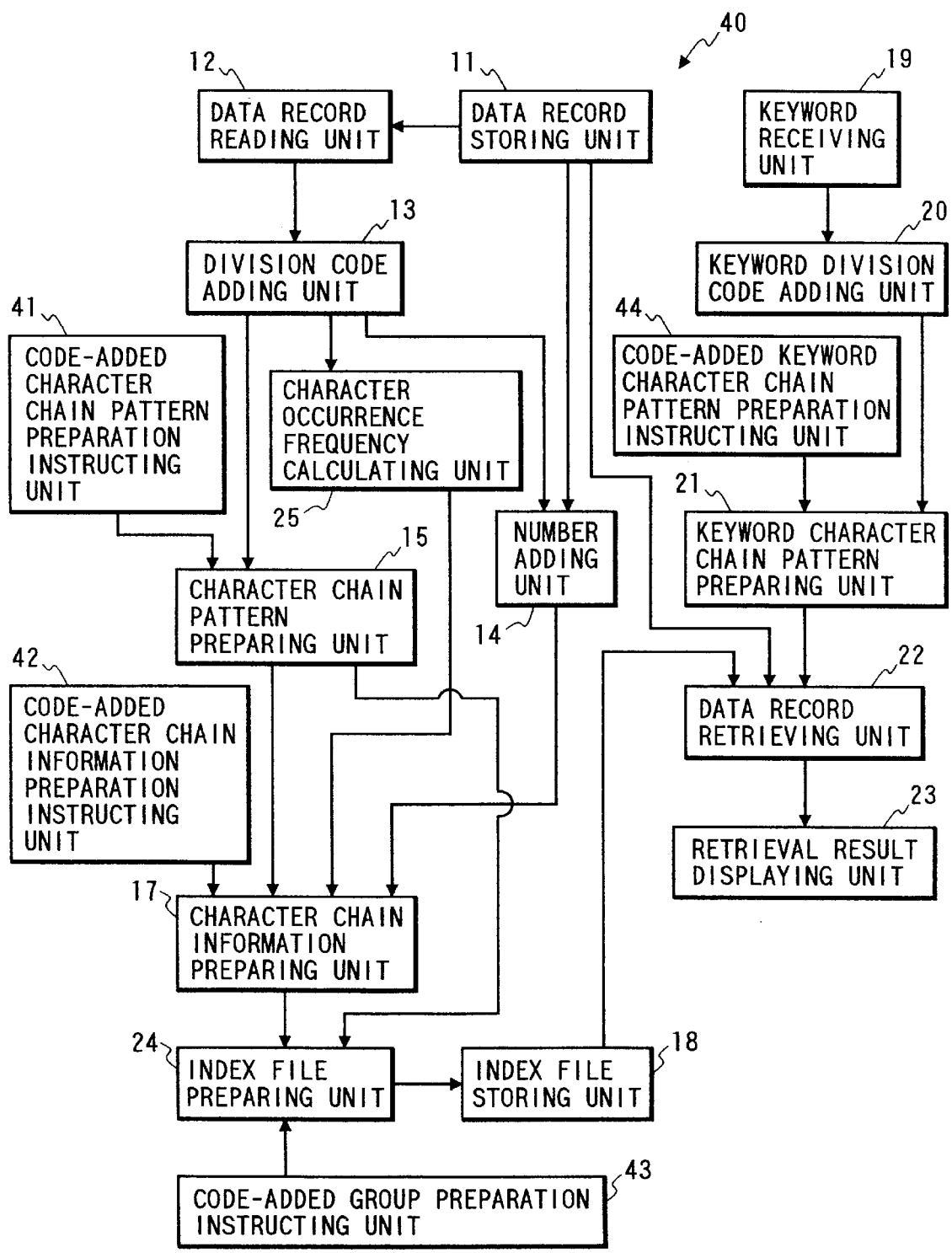
FIG. 16 is a block diagram of an information retrieval system according to a fourth embodiment of the present invention.

FIG. 16 is a block diagram of an information retrieval system according to a fourth embodiment of the present invention.

As shown in FIG. 16, an information retrieval system 40 comprises the data record storing unit 11, the data record reading unit 12, the division code adding unit 13, the number adding unit 14, the character occurrence frequency calculating unit 25, the character chain pattern preparing unit 15, the character chain information preparing unit 17, the index file preparing unit 24, the index file storing unit 18, the keyword receiving unit 19, the keyword division code adding unit 20, the keyword character chain pattern preparing unit 21, the data record retrieving unit 22, the retrieval result displaying unit 23, A code-added character chain pattern preparation instructing unit 41 for instructing the character chain pattern preparing unit 15 to set one division code and two successive characters C(1)C(2) following the division code as a front code-added character chain ^WC(1)C(2) for each division code, set one division code and two successive characters C(3)C(4) preceding the division code as a rear code-added character chain C(3)C (4)^W for each division code, prepare a front code-added character chain pattern (C(1),C(2)) from each front code-added character chain in place of a pair of character chain patterns (^W,C(1)) and (C(1),C(2)) and prepare a rear code-added character chain pattern (C(3),C(4)) from each rear code-added character chain in place of a pair of character chain patterns (C(3),C(4)) and (C(4),^W), A code-added character chain information preparation instructing unit 42 for instructing the character chain information preparing unit 17 to prepare a piece of front code-added character chain information (F(1),F(2),H,L) from each front code-added character chain pattern in place of a pair of character chain information (m,F(1),H,L) and (F(1),F(2),H,L), prepare a piece of rear code-added character chain information (F(3),F(4),H,L) from each rear code-added character chain pattern in place of a pair of character chain information (F(3),F(4),H,L) and (F(4),m,H,L), a code-added group preparation instructing unit 43 for instructing the index file preparing unit 24 to classify the front code-added character chain patterns and the pieces of front code-added character chain information as a front code-added group in the index file and classify the rear code-added character chain patterns and the pieces of rear code-added character chain information as a rear code-added group in the index file, and A code-added keyword character chain pattern preparation instructing unit 44 for instructing the keyword character chain pattern preparing unit 21 to set one division code and two successive characters Ck(1)Ck(2) following the division code as a front code-added keyword character chain ^WCk(1)Ck(2) for each division code, set one division code and two successive characters Ck(3)Ck(4) preceding the division code as a rear code-added keyword character chain Ck(3)Ck(4)^W for each division code, prepare a front code-added keyword character chain pattern (Ck(1),Ck(2)) from each front code-added keyword character chain in place of a pair of keyword character chain patterns (^W,Ck(1)) and (Ck(1),Ck(2)) and prepare a rear code-added keyword character chain pattern (Ck(3),Ck(4)) from each rear code-added keyword character chain in place of a pair of keyword character chain patterns (Ck(3),Ck(4)) and (Ck(4),^W).

Figure 17:
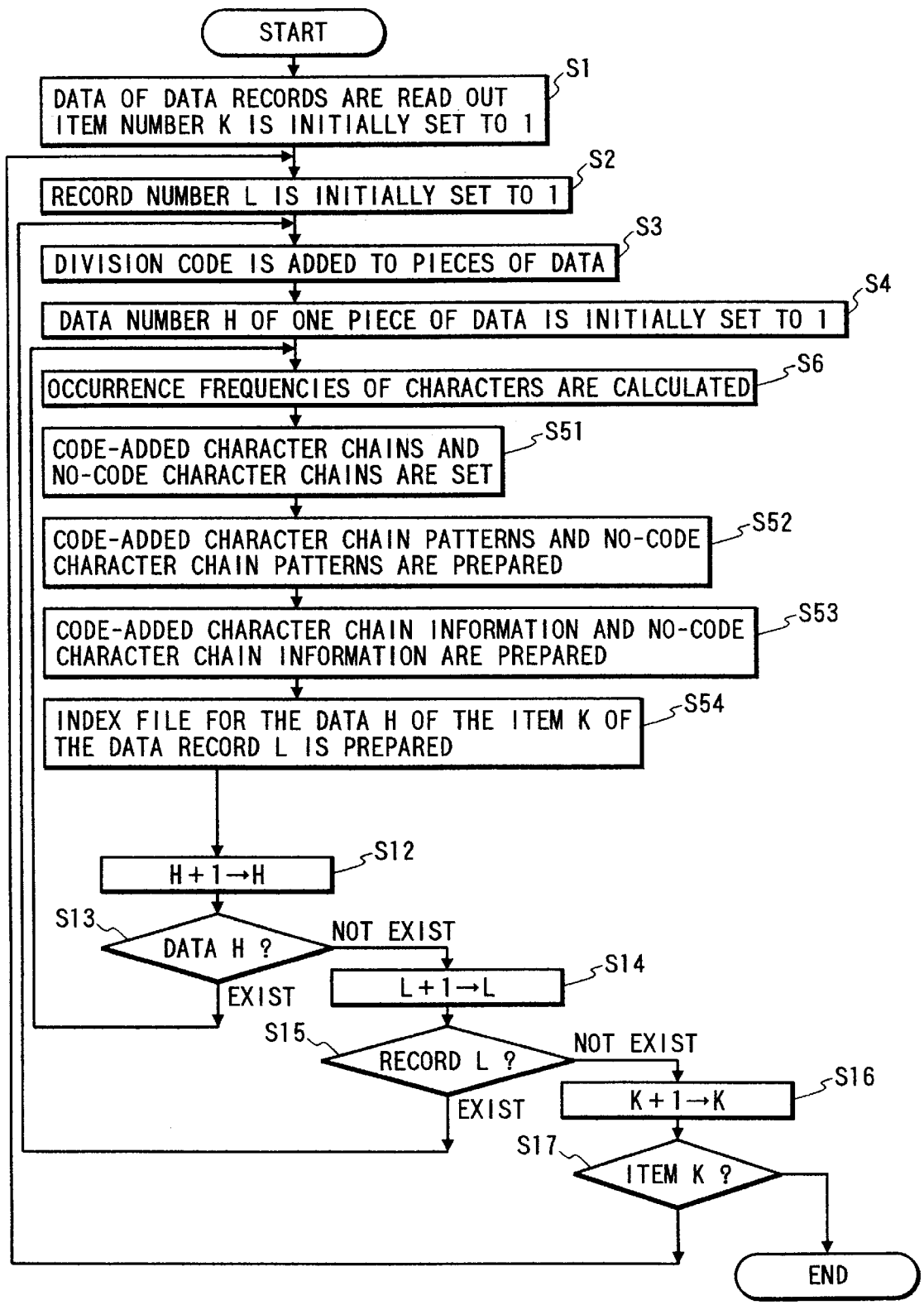
FIG. 17 is a flow chart showing the preparation of an index file according to the fourth embodiment.

In the above configuration of the information retrieval system 40, an index file is prepared according to a processing flow shown in FIG. 17.

The steps 1,2,3,4 and 6 are performed in the same manner as in the first embodiment. Thereafter, a step 51 is performed in the character chain pattern preparing unit 15 under the control of the code-added character chain pattern preparation instructing unit 41. That is, one division code and two successive characters C(1)C(2) following the division code are set as a front code-added character chain ^WC(1)C(2) for each division code of the code-added data, one division code and two successive characters C(3)C(4) preceding the division code are set as a rear code-added character chain C(3)C(4)^W for each division code of the code-added data, and two successive characters not adjacent to any division code are set as a no-code character chain for each division code of the code-added data. Thereafter, a step 52 is performed in the character chain pattern preparing unit 15 under the control of the code-added character chain pattern preparation instructing unit 41. That is, a front code-added character chain pattern (C(1),C (2)) is prepared from each front code-added character chain, a rear code-added character chain pattern (C(3),C(4)) is prepared from each rear code-added character chain and a no-code character chain pattern is prepared from each no-code character chain.

For example, as shown in FIG. 18A, in cases where a piece of code-added data "^Wabcad ^Wabad^Wafae^W" is obtained, front code-added character chains "^Wab" and "^Waf" and rear code-added character chains "ad^W" and "ae^W" are prepared. Thereafter, as shown in FIG. 18B, front code-added character chain patterns (a,b) and (a,f) are prepared for the front code-added character chains "^Wab" and "^Waf" and rear code-added character chain patterns (a,d) and (a,e) are prepared for the rear code-added character chains "ad^W" and "ae^W".

Thereafter, in a step 53, pieces of character chain information for the data H of the item K are prepared by using the character occurrence frequencies, the character chain patterns, the data number H and the record number L under the control of the code-added character chain information preparation instructing unit 42. Therefore, a piece of front code-added character chain information corresponding to each front code-added character chain pattern is prepared, a piece of rear code-added character chain information corresponding to each rear code-added character chain pattern is prepared, and a piece of no-code character chain information corresponding to each no-code character chain pattern is prepared.

For example, front code-added character chain information (1,1,1,1) and (1,1,2,1) are prepared for the front code-added character chain pattern (a,b), front code-added character chain information (1,1,3,1) is prepared for the front code-added character chain pattern (a,f), rear code-added character chain information (2,1,1,1) and (2,1,2,1) are prepared for the rear code-added character chain pattern (a,d), and rear code-added character chain information (2,1,3,1) is prepared for the rear code-added character chain pattern (a,e).

In a step 54, an index file in which the front code-added character chain information, the rear code-added character chain information and the no-code character chain information are listed in correspondence to the front code-added character chain patterns, the rear code-added character chain patterns and the no-code character chain patterns is prepared as a file for the data H of the item K of the data record L in the index file preparing unit 24 under the control of the code-added group preparation instructing unit 43, and the index file is stored in the index file storing unit 18. Therefore, the front code-added character chain patterns and the pieces of front code-added character chain information are classified as a front code-added group, the rear code-added character chain patterns and the pieces of rear code-added character chain information are classified as a rear code-added group, and the no-code character chain patterns and the pieces of no-code character chain information are classified as a no-code group.

Thereafter, the steps 12 to 17 are performed in the same manner as in the first embodiment. Therefore, the index file shown in FIG. 18B is obtained.

Accordingly, the number of character chain patterns and the number of character chain information can be decreased.

Next, a processing procedure, in which a piece of particular data including a character string agreeing with a keyword input by the user is retrieved, is described with reference to FIGS. 19 and 20.

Figure 19:
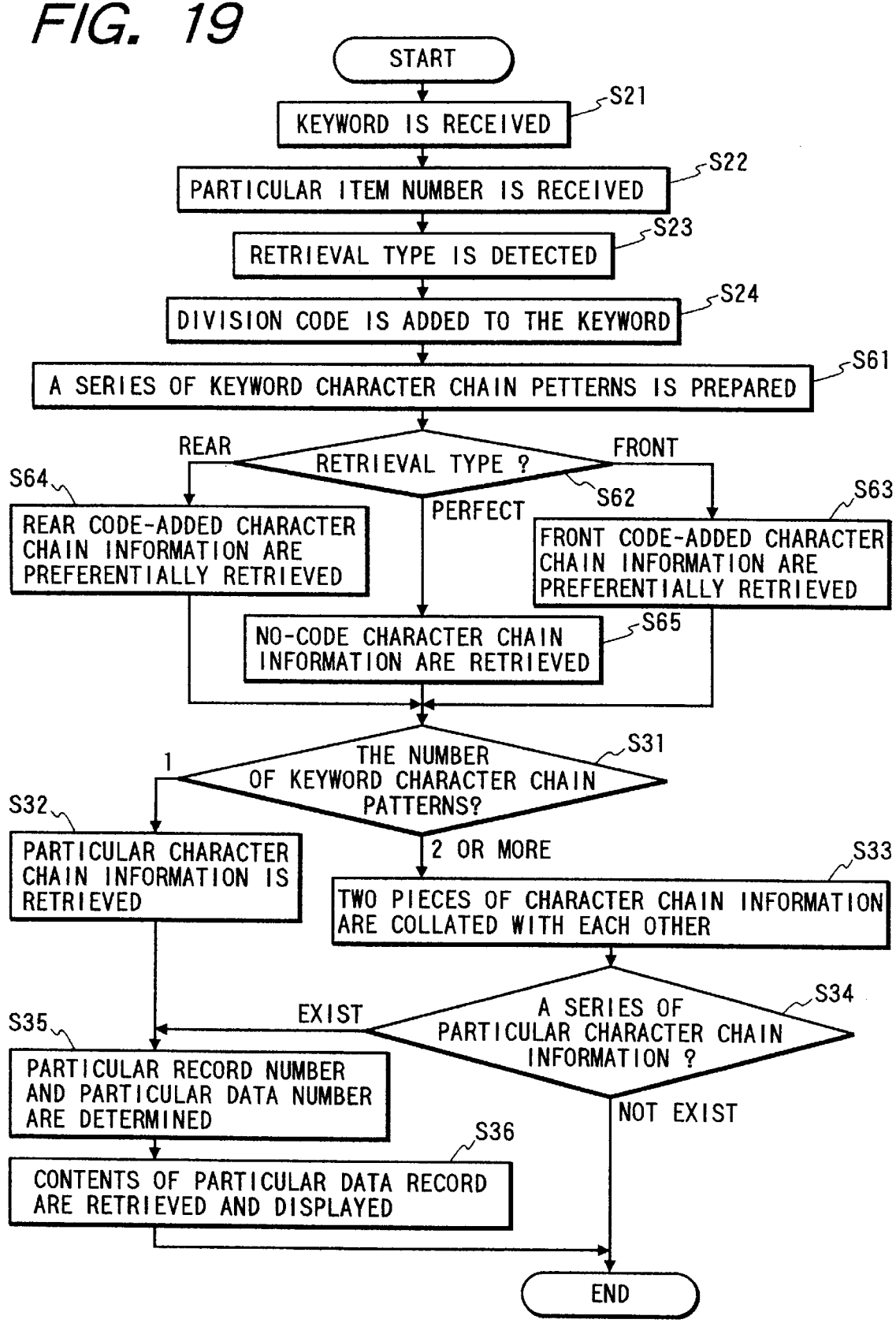
FIG. 19 is a flow chart showing the retrieval of a piece of particular data including a keyword according to the fourth embodiment.

As shown in FIG. 19, the steps 21 to 24 are performed in the same manner as in the first embodiment. For example, a keyword "afae" shown in FIG. 20A is input, and a code-added keyword "^Wafae^W" shown in FIG. 20B is prepared because any retrieval code "?" is not added and the perfect character agreement retrieval is indicated.

In a step 61, a series of keyword character chain patterns is prepared from the code-added keyword in the keyword character chain pattern preparing unit 21 under the control of the code-added keyword character chain pattern preparation instructing unit 44. For example, as shown in FIG. 20C, a front code-added keyword character chain pattern ^W(a,f), a no-code keyword character chain pattern (f,a) and a rear code-added keyword character chain pattern (a,e)^W are prepared.

In a step 62, it is judged whether a retrieval type is the front character agreement retrieval or the rear character agreement retrieval.

In a step 63, in cases where the retrieval type is the front character agreement retrieval, front code-added character chain information corresponding to the front code-added keyword character chain is preferentially retrieved from the index file storing unit 18 to the data record retrieving unit 22. Because the front code-added character chain information and the front code-added keyword character chain are classified as the front code-added group, the front code-added character chain information can be easily retrieved. Thereafter, no-code character chain information corresponding to one no-code keyword character chain is retrieved from the index file storing unit 18 to the data record retrieving unit 22 for each no-code keyword character chain, and rear code-added character chain information corresponding to the rear code-added keyword character chain is retrieved from the index file storing unit 18 to the data record retrieving unit 22. Because the no-code character chain information and the no-code keyword character chain are classified as the no-code group and the rear code-added character chain information and the rear code-added keyword character chain are classified as the rear code-added group, the no-code character chain information and the rear code-added character chain information can be easily retrieved.

In a step 64, in cases where the retrieval type is the rear character agreement retrieval, rear code-added character chain information corresponding to the rear code-added keyword character chain is preferentially retrieved from the index file storing unit 18 to the data record retrieving unit 22. Thereafter, no-code character chain information corresponding to one no-code keyword character chain is retrieved from the index file storing unit 18 to the data record retrieving unit 22 for each no-code keyword character chain, and front code-added character chain information corresponding to the front code-added keyword character chain is retrieved from the index file storing unit 18 to the data record retrieving unit 22.

In a step 65, in cases where the retrieval type is the perfect character agreement retrieval, no-code character chain information corresponding to one no-code keyword character chain is retrieved from the index file storing unit 18 to the data record retrieving unit 22 for each no-code keyword character chain. In this case, any front or rear code-added keyword character chain does not exist.

Thereafter, the steps 31 to 36 are performed in the same manner as in the first embodiment.

For example, as shown in FIG. 20D, the front code-added character chain information (1,1,3,1) corresponding to the front code-added keyword character chain ^W(a,f) is collated with the no-code character chain information (1,2,3,1) corresponding to the no-code keyword character chain (f,a) and the no-code character chain information (1,2,3,1) is collated with the rear code-added character chain information (2,1,3,1) corresponding to the rear code-added keyword character chain (a,e)^W. Thereafter, as shown in FIG. 20E, contents of a piece of particular data record 1 are displayed as retrieved information with the record number L=1, the item number K=2 and the data number H=3.

Accordingly, because a series of character chain patterns is prepared from the code-added data without including the division code in any character chain pattern and pieces of code-added character chain information corresponding to the front and rear character chain patterns are prepared, the number of character chain patterns and the number of code-added character chain information in the index file can be reduced. Therefore, the number of candidates for pieces of particular character chain information is reduced, and the data retrieval can be quickly performed.

Also, because the front code-added character chain patterns and the front code-added character chain information are classified as the front code-added group in the index file, the rear code-added character chain patterns and the rear code-added character chain information are classified as the rear code-added group in the index file and the no-code character chain patterns and the no-code character chain information are classified as the no-code group in the index file, pieces of character chain information corresponding to the keyword character chain patterns can be easily read out from the index file. Therefore, the data retrieval can be quickly performed.

Also, in cases where the front (or rear) character agreement retrieval is requested, the collation of front (or rear) code-added character chain information with another piece of character chain information can be preferentially performed because character chain information and character chain patterns in the index file are classified into three groups. Therefore, the data retrieval can be quickly performed.

(Fifth Embodiment)

In this embodiment, pieces of data registered in each item are classified into a plurality of hierarchy levels such as a first hierarchy level, a second hierarchy level and a third hierarchy level, a user inputs a keyword and a particular hierarchy level of the keyword, and a piece of particular data including the keyword is retrieved from pieces of data ranked to the particular level in a plurality of items.

Figure 21:
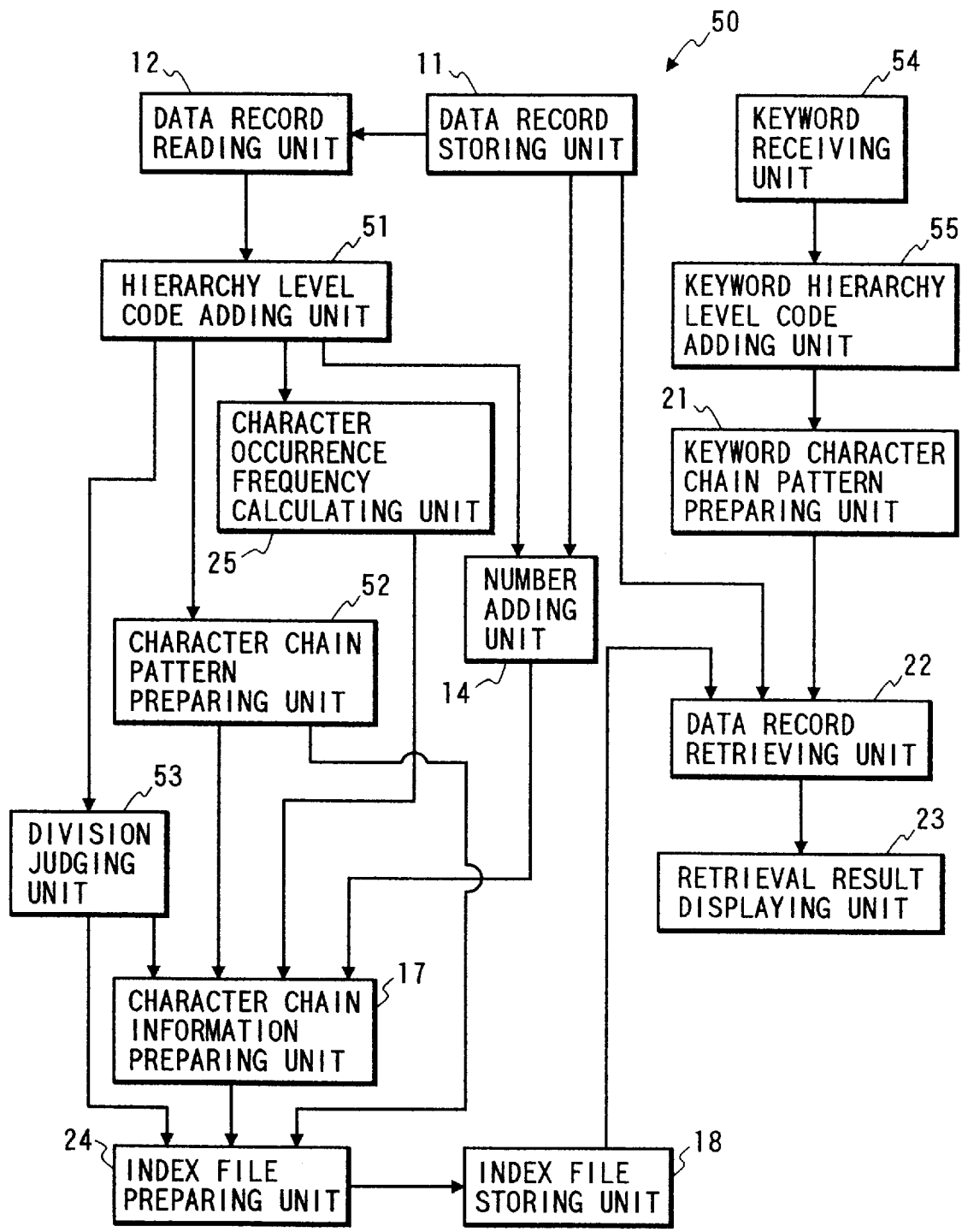
FIG. 21 is a block diagram of an information retrieval system according to a fifth embodiment of the present invention.

FIG. 21 is a block diagram of an information retrieval system according to a fifth embodiment of the present invention.

As shown in FIG. 21, an information retrieval system 50 comprises the data record storing unit 11, the data record reading unit 12, the number adding unit 14, a hierarchy level code adding unit 51 for adding a hierarchy level code to both ends of each piece of data registered in each item according to a hierarchy level of the data to specify the hierarchy level of each piece of data and divide the pieces of data, the character occurrence frequency calculating unit 25, a character chain pattern preparing unit 52 for preparing a character chain pattern of each pair of characters adjacent to each other in one piece of code-added data for each piece of code-added data of the items while shifting the characters of each piece of code-added data one by one, a division judging unit 53 for preparing a character chain pattern of each pair of one hierarchy level code and one character adjacent to the hierarchy level code in one piece of code-added data for each piece of code-added data of the items while shifting the characters of each piece of code-added data one by one and deleting each character chain pattern relating to one pair of hierarchy level codes, the character chain information preparing unit 17, the index file preparing unit 24, the index file storing unit 18, a keyword receiving unit 54 for receiving a keyword input by a user, receiving a retrieval type such as a partial character agreement retrieval, a front character agreement retrieval, a rear character agreement retrieval or a perfect character agreement retrieval and receiving a keyword hierarchy level of the keyword, a keyword hierarchy level code adding unit 55 for judging whether or not a retrieval type code "?" indicating the retrieval type exists in a top or bottom position of the keyword, detecting the retrieval type according to the existence of the retrieval type code and the position of the retrieval type code in the keyword, adding a hierarchy level code corresponding to the keyword hierarchy level of the keyword received in the keyword receiving unit 54 to one end or both ends of the keyword according to the retrieval type to produce a code-added keyword, the keyword character chain pattern preparing unit 21, the data record retrieving unit 22, and the retrieval result displaying unit 23.

Figure 22:
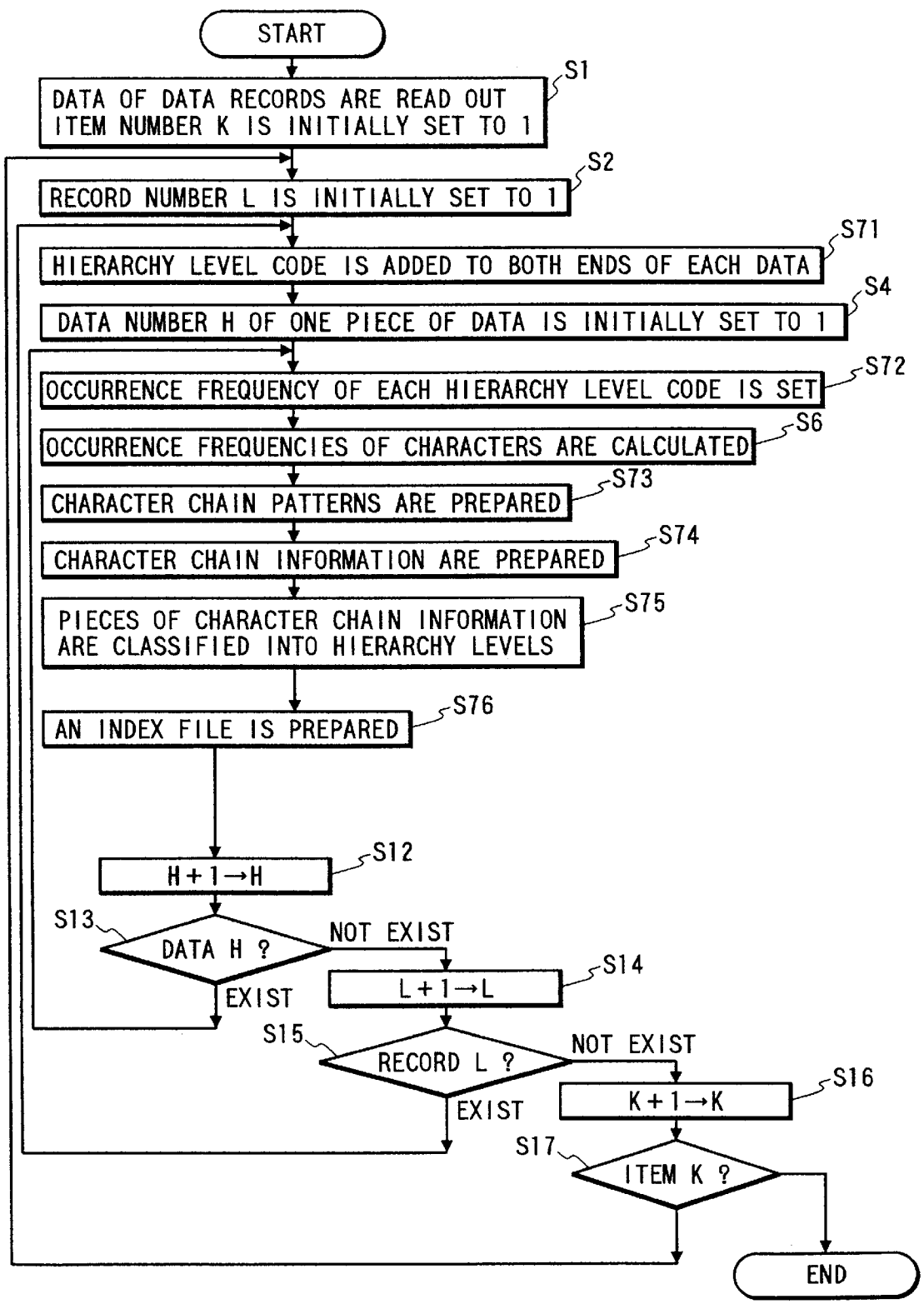
FIG. 22 is a flow chart showing the preparation of an index file according to the fifth embodiment.

In the above configuration of the information retrieval system 50, the preparation of an index file is performed according to a processing flow shown in FIG. 22.

The steps 1 and 2 are performed in the same manner as in the first embodiment. Thereafter, in a step 71, a hierarchy level code is added to both ends of each piece of data registered in the item K of the data record L according to a hierarchy level of the data in the hierarchy level code adding unit 51 to prepare a piece of code-added data and specify the hierarchy level of each piece of data in the code-added data.

For example, pieces of data "Tokyo Metropolis", "Shinagawa to Shibuya", "Shibuya station", "Kanagawa prefecture", "Yokohama to Kamakura" and "Yokohama Bay" are registered in the item 2 on condition that the pieces of data satisfy a hierarchy condition shown in FIG. 23A, a hierarchy level code "^S" indicating a first hierarchy level is added to both ends of the data "Tokyo Metropolis" and both ends of the data "Kanagawa prefecture", a hierarchy level code "^T" indicating a second hierarchy level is added to both ends of the data "Shinagawa to Shibuya" and both ends of the data "Yokohama to Kamakura", and a hierarchy level code "^U" indicating a third hierarchy level is added to both ends of the data "Shibuya station" and both ends of the data "Yokohama Bay". Therefore, as shown in FIG. 23B, a piece of code-added data is obtained.

In this case, a character string "To" and the other character string "kyo" in the word "Tokyo" are respectively written by one Chinese character used in Japanese writing. Also, a word "Metropolis", a character string "Shina" and the other character string "gawa" in the word "Shinagawa", a character string "Shibu" and the other character string "ya" in the word "Shibuya" and a character string "station" are respectively written by one Chinese character used in Japanese writing. Also, a character string "Ka", a character string "na" and the other character string "gawa" in the word "Kanagawa", a word "prefecture", a character string "Yoko" and the other character string "hama" in the word "Yokohama", a character string "Kama" and the other character string "kura" in the word "Kamakura" and the word "Bay" are respectively written by one Chinese character used in Japanese writing. Therefore, the character strings and words respectively written by one Chinese character are respectively treated as one character in this embodiment. Also, any blank does not exist between a pair of adjacent words in Japanese writing. Therefore, blanks existing in the pieces of data are disregarded in this embodiment.

Thereafter, the step 4 is performed in the same manner as in the first embodiment.

In a step 72, an occurrence frequency for each hierarchy level code added to the data H is set according to a type of the hierarchy level code. For example, an occurrence frequency for the hierarchy level code "^S" is set to 1, an occurrence frequency for the hierarchy level code "^T" is set to 2, and an occurrence frequency for the hierarchy level code "^U" is set to 3.

Thereafter, the step 6 is performed in the same manner as in the first embodiment.

In a step 73, a character chain pattern (C(1),C(2)) is prepared in the character chain pattern preparing unit 52 for each pair of characters adjacent to each other in the data H. In this case, a character chain pattern relating to the hierarchy level code is prepared in the division judging unit 53 for each division code, and each character chain pattern relating to one pair of hierarchy level codes is deleted.

In a step 74, the character occurrence frequencies and the character chain patterns obtained in the character chain pattern preparing unit 52 and the division judging unit 53 and the data number H and the record number L added in the number adding unit 14 are transmitted to the character chain information preparing unit 17, and pieces of character chain information corresponding to the character chain patterns are prepared by using the character occurrence frequencies, the data number H and the record number L.

In a step 75, pieces of character chain information are classified into a plurality of hierarchy levels of three types of character chain information in the index file preparing unit 24. For example, when C(1) of one character chain pattern corresponding to one piece of character chain information is equal to "^S", the piece of character chain information and the character chain pattern are classified into the first hierarchy level of the first type of character chain information. When C(1) of one character chain pattern corresponding to one piece of character chain information is equal to "^T", the piece of character chain information and the character chain pattern are classified into the second hierarchy level of the first type of character chain information. When C(1) of one character chain pattern corresponding to one piece of character chain information is equal to "^U", the piece of character chain information and the character chain pattern are classified into the third hierarchy level of the first type of character chain information. When C(2) of one character chain pattern corresponding to one piece of character chain information is equal to "^S", "^T" or "^U", the piece of character chain information and the character chain pattern are classified into the first, second or third hierarchy level of the second type of character chain information. When any of C(1) and C(2) of one character chain pattern corresponding to one piece of character chain information is not equal to one hierarchy level code, the piece of character chain information and the character chain pattern are classified as the third type of character chain information.

In a step 76, an index file of the pieces of character chain information corresponding to the character chain patterns are prepared as a file for the data H of the item K of the data record L and is stored in the index file storing unit 18.

Thereafter, the steps 12 to 15 are performed in the same manner as in the first embodiment. Therefore, as shown in FIG. 23C, an index file for the item K is prepared in the index file preparing unit 24 and is stored in the index file storing unit 18. Thereafter, the steps 16 and 17 are performed in the same manner as in the first embodiment, and index files for all items are prepared and stored.

Next, a processing procedure, in which a piece of particular data including a character string agreeing with a keyword input by the user is retrieved, is described with reference to FIGS. 24 and 25.

As shown in FIG. 24, in a step 81, a keyword and a keyword hierarchy level of the keyword is received in the keyword receiving unit 41. For example, as shown in FIG. 25A, a keyword "?Shibuya" indicating the rear character agreement retrieval and a second hierarchy level are input.

Thereafter, the steps 22 and 23 are performed in the same manner as in the first embodiment.

In a step 82, a keyword hierarchy level code corresponding to the keyword hierarchy level of the keyword is determined in the keyword hierarchy level code adding unit 55. For example, because the second hierarchy level is input, a keyword hierarchy level code "^T" is determined.

In a step 83, a retrieval type is detected according to the position of the retrieval type code "?" in the keyword, and one or two keyword hierarchy level codes are added to the keyword according to the retrieval type in the keyword hierarchy level code adding unit 55, so that a code-added keyword is prepared. For example, as shown in FIG. 25B, the rear character agreement retrieval is detected, and a code-added keyword "Shibuya^T" is prepared.

In a step 84, a series of keyword character chain patterns is prepared from the code-added keyword in the keyword character chain pattern preparing unit 21. For example, as shown in FIG. 25C, a first keyword character chain pattern (Shibu,ya) and a second keyword character chain pattern (ya,^T) are prepared in series.

In steps 85 to 87, in the data record retrieving unit 22, a particular index file for the particular item identified by the particular item number is specified, and a series of particular character chain information corresponding to the series of keyword character chain patterns is extracted from the particular index file stored in the index file storing unit 18.

In cases where a first element C(1) of one keyword character chain pattern (C(1),C(2)) is one keyword hierarchy level code, all pieces of character chain information corresponding to the keyword character chain pattern are extracted from among the first type of pieces of character chain information in the step 85. In cases where a second element C(2) of one keyword character chain pattern (C(1),C(2)) is one keyword hierarchy level code, all pieces of character chain information corresponding to the keyword character chain pattern are extracted from the second type of pieces of character chain information in the step 86. In cases where any element of one keyword character chain pattern (C(1),C(2)) is not any keyword hierarchy level code, all pieces of character chain information corresponding to the keyword character chain pattern are extracted from the third type of pieces of character chain information in the step 87.

Thereafter, the steps 31 to 36 are performed in the same manner as in the first embodiment.

Accordingly, even though pieces of data registered in each item are hierarchically ranked, because a hierarchy level code is added to each piece of data according to a hierarchy level of the data, pieces of character chain information listed in an index file can be classified into a plurality of hierarchy levels. Also, when a user intends to retrieve a piece of particular data including a keyword, because the user inputs the keyword and a keyword hierarchy level of the keyword, the retrieval operation can be performed with a high speed.

Figure 27:
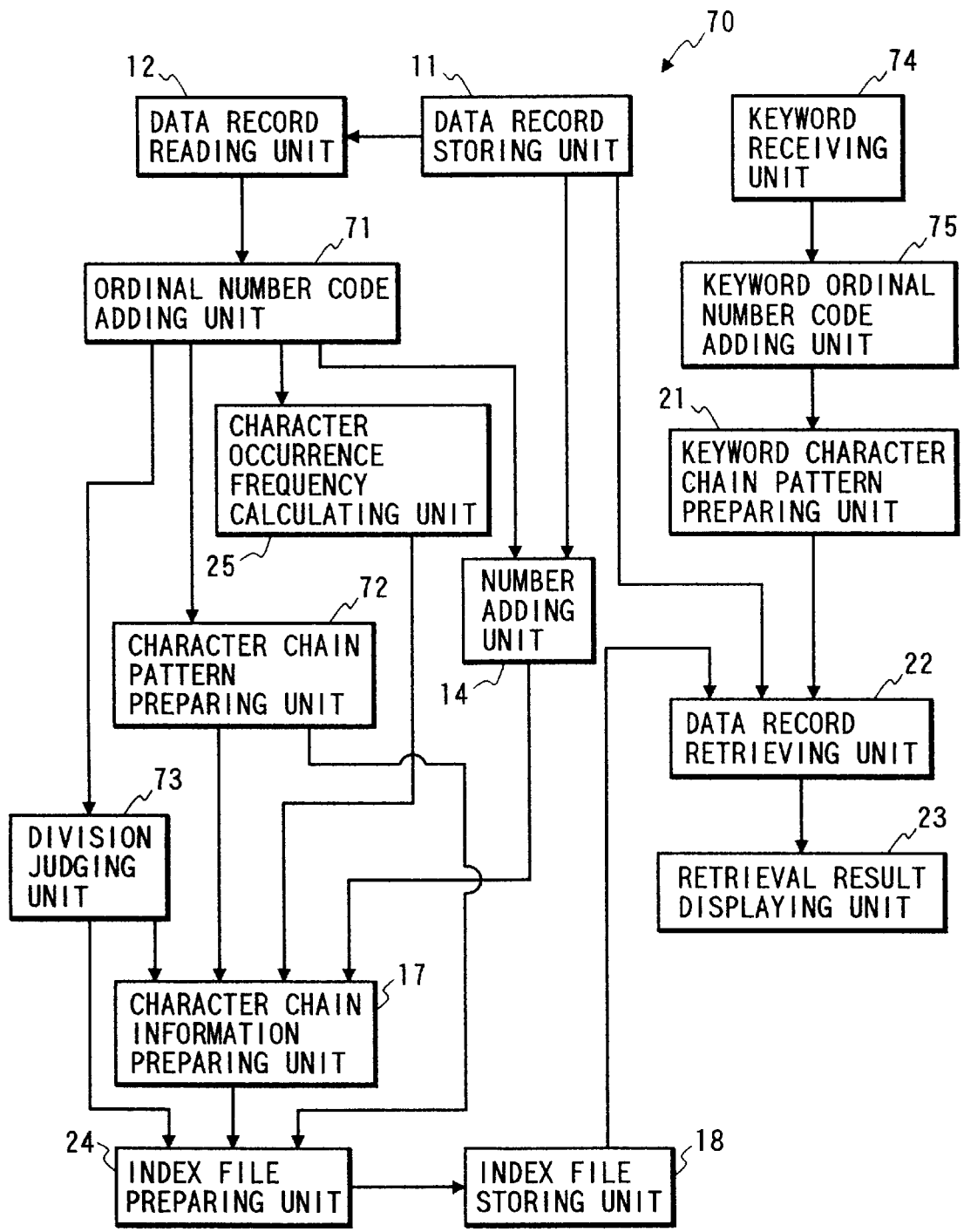
FIG. 27 is a block diagram of an information retrieval system according to a modification of the fifth embodiment of the present invention.

In the fifth embodiment, a hierarchy level code is added to both ends of each piece of data according to a hierarchy level of the data. However, as shown in FIG. 26, it is applicable that an ordinal number indicating an sequent order be attached to each piece of data registered in a data record and an ordinal number code corresponding to the ordinal number be added to both ends of the piece of data. In this case, as shown in FIG. 27, an information retrieval system 70 comprises the data record storing unit 11, the data record reading unit 12, the number adding unit 14, an ordinal number code adding unit 71 for adding an ordinal number code to both ends of each piece of data registered in each item according to an sequent order of the data to specify the an sequent order of each piece of data and divide the pieces of data, the character occurrence frequency calculating unit 25, a character chain pattern preparing unit 72 for preparing a character chain pattern of each pair of characters adjacent to each other in one piece of code-added data for each piece of code-added data of the items while shifting the characters of each piece of code-added data one by one, a division judging unit 73 for preparing a character chain pattern of each pair of one ordinal number code and one character adjacent to the ordinal number code in one piece of code-added data for each piece of code-added data of the items while shifting the characters of each piece of code-added data one by one and deleting each character chain pattern relating to one pair of ordinal number codes, the character chain information preparing unit 17, the index file preparing unit 24, the index file storing unit 18, a keyword receiving unit 74 for receiving a keyword input by a user, receiving a retrieval type such as a partial character agreement retrieval, a front character agreement retrieval, a rear character agreement retrieval or a perfect character agreement retrieval and receiving a keyword sequent order of the keyword, a keyword ordinal number code adding unit 75 for judging whether or not a retrieval type code "?" indicating the retrieval type exists in a top or bottom position of the keyword, detecting the retrieval type according to the existence of the retrieval type code and the position of the retrieval type code in the keyword, adding an ordinal number code corresponding to the keyword sequent order of the keyword received in the keyword receiving unit 74 to one end or both ends of the keyword according to the retrieval type to produce a code-added keyword, the keyword character chain pattern preparing unit 21, the data record retrieving unit 22, and the retrieval result displaying unit 23.

In the above configuration, as shown in FIG. 28, an index file, in which pieces of character chain information corresponding to character chain patterns are listed for each ordinal number code, is prepared.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims:

What is claimed is:

1. An information retrieval system, comprising:

data record storing means for storing a plurality of data records, pieces of data respectively composed of a plurality of characters being registered in a particular item of each data record;

division code adding means for adding a division code to both ends of a group of the pieces of data registered in the particular item and between each pair of data adjacent to each other in the group of the pieces of data for each data record to produce a piece of code-added data for each data record, each piece of data in the code-added data being placed between the division codes;

number allocating means for allocating a record number to each piece of data registered in each data record to identify the data records relating to the pieces of data and allocating a data number to each piece of data registered in the particular item of each data record to identify the pieces of data;

character occurrence frequency calculating means for calculating an occurrence frequency of each of a plurality of characters of one piece of data for each piece of data registered in the same particular item of the data records and setting an occurrence frequency of each of the division codes of the pieces of code-added data to a particular value, an occurrence frequency of a current character in one piece of data indicating that at what frequency a character belonging to the same character type as that of the current character appears among characters placed between a top position of the piece of data and a current position of the current character;

character chain pattern preparing means for preparing a first character chain pattern of each pair of characters adjacent to each other in one code-added data produced by the division code adding means for each code-added data and preparing a second character chain pattern of each pair of one division code and one character adjacent to the division code in one code-added data for each code-added data;

character chain information preparing means for preparing a piece of character chain information corresponding to each of the first and second character chain patterns prepared by the character chain pattern preparing means according to the occurrence frequencies obtained by the character occurrence frequency calculating means and the data numbers and the record numbers allocated by the number allocating means, each piece of character chain information being composed of two occurrence frequencies of two characters of one piece of data or both one character and one division code of one piece of data corresponding to one first or second character chain pattern, one data number of the piece of data and one record number of the piece of data;

index file preparing means for preparing an index file for the particular item in which the pieces of character chain information prepared by the character chain information preparing means are listed in correspondence to the first and second character chain patterns prepared by the character chain pattern preparing means;

keyword preparing means for preparing a keyword composed of a plurality of characters;

keyword division code adding means for adding the division code to one end or both ends of the keyword prepared by the keyword preparing means to produce a piece of code-added keyword;

keyword character chain pattern preparing means for preparing a first keyword character chain pattern of each pair of characters adjacent to each other in the code-added keyword produced by the keyword division code adding means, preparing a second keyword character chain pattern of each pair of one division code and one character adjacent to the division code in the code-added keyword, and preparing a series of keyword character chain patterns by arranging the first and second keyword character chain patterns in the order of the characters and division codes in the code-added keyword;

data record retrieving means for extracting a series of particular character chain information corresponding to the series of keyword character chain patterns prepared by the keyword character chain pattern preparing means from the index file for the particular item prepared by the index file preparing means on condition that a plurality of data numbers in the pieces of particular character chain information agree with each other, a plurality of record numbers in the pieces of particular character chain information agree with each other and two occurrence frequencies of the same character indicated by each pair of particular character chain information agree with each other, judging that the keyword is included in a piece of particular data identified by both a particular data number and a particular record number common to the pieces of particular character chain information, and retrieving a particular data record identified by the particular record number from the data records stored in the data record storing means; and retrieved data record displaying means for displaying the particular data record retrieved by the data record retrieving means as a piece of retrieved information.

2. An information retrieval system according to claim 1 in which the data record retrieving means comprises:

character chain information collating means for collating a pair of character chain information corresponding to each pair of keyword character chain patterns adjacent to each other in the series of keyword character chain pattern to extract the series of particular character chain information corresponding to the series of keyword character chain patterns; and preferential collation instructing means for instructing the character chain information collating means to preferentially collate one piece of character chain information corresponding to one second keyword character chain pattern with another piece of character chain information corresponding to one first keyword character chain pattern adjacent to the second keyword character chain pattern in the series of keyword character chain patterns.

3. An information retrieval system according to claim 1 in which the division code adding means comprises a hierarchy level code adding unit for adding a hierarchy level code to both ends of each piece of data registered in the particular item as the division code according to a hierarchy level of the piece of data for each data record to place each piece of data between the hierarchy level codes indicating the hierarchy level of the piece of data, the keyword preparing means comprises a keyword receiving unit for receiving the keyword input by a user and receiving a keyword hierarchy level of the keyword, and the keyword division code adding means comprises a keyword hierarchy level code adding unit for adding a keyword hierarchy level code corresponding to the keyword hierarchy level of the keyword received by the keyword receiving unit to one end or both ends of the keyword as the division code, wherein a piece of data placed between particular hierarchy level codes agreeing with the keyword hierarchy level codes is judged as the piece of particular data including the keyword by the data record retrieving means.

4. An information retrieval system according to claim 1 in which the division code adding means comprises an ordinal number code adding unit for adding an ordinal number code to both ends of each piece of data registered in the particular item as the division code according to an sequent order of the piece of data for each data record to place each piece of data between the ordinal number codes indicating the sequent order of the piece of data, the keyword preparing means comprises a keyword receiving unit for receiving the keyword input by a user and receiving a keyword sequent order of the keyword, and the keyword division code adding means comprises a keyword ordinal number code adding unit for adding a keyword ordinal number code corresponding to the keyword sequent order of the keyword received by the keyword receiving unit to one end or both ends of the keyword as the division code, wherein a piece of data placed between particular ordinal number codes agreeing with the keyword ordinal number codes is judged as the piece of particular data including the keyword by the data record retrieving means.

5. An information retrieval system according to claim 1 in which the keyword preparing means comprises a keyword receiving unit for receiving the keyword input by a user and receiving a first retrieval type indicating a perfect character agreement retrieval, a second retrieval type indicating a front character agreement retrieval or a third retrieval type indicating a rear character agreement retrieval, the keyword division code adding means comprises a keyword division code adding unit for adding the division code to both ends of the keyword in cases where the first retrieval type is received by the keyword receiving unit, adding the division code to a front end of the keyword in cases where the second retrieval type is received by the keyword receiving unit and adding the division code to a rear end of the keyword in cases where the third retrieval type is received by the keyword receiving unit, and the data record retrieving means comprises:

character chain information collating means for collating a pair of character chain information corresponding to each pair of keyword character chain patterns adjacent to each other in the order or the reverse order of the arrangement of the keyword character chain patterns in the series of keyword character chain pattern, in cases where the first retrieval type is received by the keyword receiving unit, to extract the series of particular character chain information corresponding to the series of keyword character chain patterns, collating a pair of character chain information corresponding to each pair of keyword character chain patterns adjacent to each other in the order of the arrangement of the keyword character chain patterns in the series of keyword character chain pattern, in cases where the second retrieval type is received by the keyword receiving unit, to extract the series of particular character chain information corresponding to the series of keyword character chain patterns, and collating a pair of character chain information corresponding to each pair of keyword character chain patterns adjacent to each other in the reverse order of the arrangement of the keyword character chain patterns in the series of keyword character chain pattern, in cases where the third retrieval type is received by the keyword receiving unit, to extract the series of particular character chain information corresponding to the series of keyword character chain patterns.

6. An information retrieval system according to claim 1 in which the character occurrence frequency calculating means comprises a character set preparing unit for dividing a plurality of characters of each code-added data to a plurality of character sets respectively composed of a group of adjacent characters on condition that a space included in each piece of data and the division code added in each code-added data are set as characters; and a character set occurrence frequency calculating unit for calculating an occurrence frequency of each character set prepared by the character set preparing unit in one piece of data for each piece of data registered in the same particular item of the data records in place of the occurrence frequency of each character, the character chain pattern preparing means comprises
 a character chain pattern preparing unit for preparing a character chain pattern of each pair of character sets adjacent to each other in one code-added data produced by the division code adding means for each code-added data as one first or second character chain pattern, and the keyword character chain pattern preparing means comprises
 a keyword character set preparing unit for dividing a plurality of characters of the code-added keyword to a plurality of keyword character sets respectively composed of a group of adjacent characters on condition that the division code added in the code-added keyword is set as a character; and
 a keyword character chain pattern preparing unit for preparing a keyword character chain pattern of each pair of adjacent character sets prepared by the keyword character set preparing unit as one first or second keyword character chain pattern.

7. An information retrieval system, comprising:
 data record storing means for storing a plurality of data records, pieces of data respectively composed of a plurality of characters being registered in a particular item of each data record;
 division code adding means for adding a division code to both ends of a group of the pieces of data registered in the particular item and between each pair of data adjacent to each other in the group of the pieces of data for each data record to produce a piece of code-added data for each data record, each piece of data in the code-added data being placed between the division codes;
 number allocating means for allocating a record number to each piece of data registered in each data record to identify the data records relating to the pieces of data and allocating a data number to each piece of data registered in the particular item of each data record to identify the pieces of data;
 character occurrence frequency calculating means for calculating an occurrence frequency of each of a plurality of characters of one piece of data for each piece of data registered in the same particular item of the data records, an occurrence frequency of a current character in one piece of data indicating that at what frequency a character belonging to the same character type as that of the current character appears among characters placed between a top position of the piece of data and a current position of the current character;
 character chain pattern preparing means for preparing a first character chain pattern of each pair of characters adjacent to each other and not adjacent to any division code in one code-added data produced by the division code adding means for each code-added data and preparing a second character chain pattern of each pair of characters adjacent to each other and adjacent to one division code in one code-added data produced by the division code adding means for each code-added data;
 character chain information preparing means for preparing a piece of character chain information corresponding to each of the first and second character chain patterns prepared by the character chain pattern preparing means according to the occurrence frequencies obtained by the character occurrence frequency calculating means and the data numbers and the record numbers allocated by the number allocating means, each piece of character chain information being composed of two occurrence frequencies of two characters of one piece of data corresponding to one first or second character chain pattern, one data number of the piece of data and one record number of the piece of data;
 index file preparing means for preparing an index file for the particular item in which the pieces of character chain information prepared by the character chain information preparing means are listed in correspondence to the first and second character chain patterns prepared by the character chain pattern preparing means;
 keyword preparing means for preparing a keyword composed of a plurality of characters;
 keyword division code adding means for adding the division code to one end or both ends of the keyword prepared by the keyword preparing means to produce a piece of code-added keyword;
 keyword character chain pattern preparing means for preparing a first keyword character chain pattern of each pair of characters adjacent to each other and not adjacent to any division code in the code-added keyword produced by the keyword division code adding means, preparing a second keyword character chain pattern of each pair of characters adjacent to each other and adjacent to one division code in the code-added keyword, and preparing a series of keyword character chain patterns by arranging the first and second keyword character chain patterns in the order of the characters and division codes in the code-added keyword;
 data record retrieving means for extracting a series of particular character chain information corresponding to the series of keyword character chain patterns prepared by the keyword character chain pattern preparing means from the index file for the particular item prepared by the index file preparing means on condition that a plurality of data numbers in the pieces of particular character chain information agree with each other, a plurality of record numbers in the pieces of particular character chain information agree with each other and two occurrence frequencies of the same character indicated by each pair of particular character chain information agree with each other, judging that the keyword is included in a piece of particular data identified by both a particular data number and a particular record number common to the pieces of particular character chain information, and retrieving a particular data record identified by the particular record number from the data records stored in the data record storing means; and
 retrieved data record displaying means for displaying the particular data record retrieved by the data record retrieving means as a piece of retrieved information.

8. An information retrieval system according to claim 7 in which the data record retrieving means comprises:
 character chain information collating means for collating a pair of character chain information corresponding to each pair of keyword character chain patterns adjacent to each other in the series of keyword character chain pattern to extract the series of particular character chain information corresponding to the series of keyword character chain patterns; and
 preferential collation instructing means for instructing the character chain information collating means to preferentially collate one piece of character chain information corresponding to one second keyword character chain pattern with another piece of character chain information corresponding to one first keyword character chain pattern adjacent to the second keyword character chain pattern in the series of keyword character chain patterns.

9. An information retrieval system according to claim 7 in which the division code adding means comprises a hierarchy level code adding unit for adding a hierarchy level code to both ends of each piece of data registered in the particular item as the division code according to a hierarchy level of the piece of data for each data record to place each piece of data between the hierarchy level codes indicating the hierarchy level of the piece of data, the keyword preparing means comprises a keyword receiving unit for receiving the keyword input by a user and receiving a keyword hierarchy level of the keyword, and the keyword division code adding means comprises a keyword hierarchy level code adding unit for adding a keyword hierarchy level code corresponding to the keyword hierarchy level of the keyword received by the keyword receiving unit to one end or both ends of the keyword as the division code, wherein a piece of data placed between * particular hierarchy level codes agreeing with the keyword hierarchy level codes is judged as the piece of particular data including the keyword by the data record retrieving means.

10. An information retrieval system according to claim 7 in which the division code adding means comprises an ordinal number code adding unit for adding an ordinal number code to both ends of each piece of data registered in the particular item as the division code according to an sequent order of the piece of data for each data record to place each piece of data between the ordinal number codes indicating the sequent order of the piece of data, the keyword preparing means comprises a keyword receiving unit for receiving the keyword input by a user and receiving a keyword sequent order of the keyword, and the keyword division code adding means comprises a keyword ordinal number code adding unit for adding a keyword ordinal number code corresponding to the keyword sequent order of the keyword received by the keyword receiving unit to one end or both ends of the keyword as the division code, wherein a piece of data placed between particular ordinal number codes agreeing with the keyword ordinal number codes is judged as the piece of particular data including the keyword by the data record retrieving means.

11. An information retrieval system according to claim 7 in which the keyword preparing means comprises a keyword receiving unit for receiving the keyword input by a user and receiving a first retrieval type indicating a perfect character agreement retrieval, a second retrieval type indicating a front character agreement retrieval or a third retrieval type indicating a rear character agreement retrieval, the keyword division code adding means comprises a keyword division code adding unit for adding the division code to both ends of the keyword in cases where the first retrieval type is received by the keyword receiving unit, adding the division code to a front end of the keyword in cases where the second retrieval type is received by the keyword receiving unit and adding the division code to a rear end of the keyword in cases where the third retrieval type is received by the keyword receiving unit, and the data record retrieving means comprises:

character chain information collating means for collating a pair of character chain information corresponding to each pair of keyword character chain patterns adjacent to each other in the order or the reverse order of the arrangement of the keyword character chain patterns in the series of keyword character chain pattern, in cases where the first retrieval type is received by the keyword receiving unit, to extract the series of particular character chain information corresponding to the series of keyword character chain patterns, collating a pair of character chain information corresponding to each pair of keyword character chain patterns adjacent to each other in the order of the arrangement of the keyword character chain patterns in the series of keyword character chain pattern, in cases where the second retrieval type is received by the keyword receiving unit, to extract the series of particular character chain information corresponding to the series of keyword character chain patterns, and collating a pair of character chain information corresponding to each pair of keyword character chain patterns adjacent to each other in the reverse order of the arrangement of the keyword character chain patterns in the series of keyword character chain pattern, in cases where the third retrieval type is received by the keyword receiving unit, to extract the series of particular character chain information corresponding to the series of keyword character chain patterns.

12. An information retrieval system according to claim 7 in which the character occurrence frequency calculating means comprises a character set preparing unit for dividing a plurality of characters of each code-added data to a plurality of character sets respectively composed of a group of adjacent characters on condition that a space included in each piece of data and the division code added in each code-added data are set as characters; and a character set occurrence frequency calculating unit for calculating an occurrence frequency of each character set prepared by the character set preparing unit in one piece of data for each piece of data registered in the same particular item of the data records in place of the occurrence frequency of each character, the character chain pattern preparing means comprises a character chain pattern preparing unit for preparing a character chain pattern of each pair of character sets adjacent to each other in one code-added data produced by the division code adding means for each code-added data as one first or second character chain pattern, and the keyword character chain pattern preparing means comprises a keyword character set preparing unit for dividing a plurality of characters of the code-added keyword to a plurality of keyword character sets respectively composed of a group of adjacent characters on condition that the division code added in the code-added keyword is set as a character; and a keyword character chain pattern preparing unit for preparing a keyword character chain pattern of each pair of adjacent character sets prepared by the keyword character set preparing unit as one first or second keyword character chain pattern.

* * * * *